United States Patent
Barascud et al.

(10) Patent No.: US 12,554,327 B1
(45) Date of Patent: Feb. 17, 2026

(54) BRAIN-AWARE EXTENDED REALITY

(71) Applicant: Snap Inc., Santa Monica, CA (US)

(72) Inventors: Nicolas Barascud, Brinckheim (FR); Antoine Barbot, Paris (FR); Hanna Berriche, Paris (FR); Rasheed El Bouri, Paris (FR); Enguerrand Gentet, Paris (FR); Steven Hwang, Rolling Hills Estates, CA (US); Sid Kouider, Paris (FR); Bertrand Oustrière, Paris (FR); Guillaume Ployart, Paris (FR); Clement Royen, Paris (FR); Nelson Steinmetz, Paris (FR)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 19/081,554

(22) Filed: Mar. 17, 2025

(51) Int. Cl.
*G06F 3/01* (2006.01)

(52) U.S. Cl.
CPC .............. *G06F 3/015* (2013.01); *G06F 3/013* (2013.01)

(58) Field of Classification Search
CPC ........... G06F 3/011; G06F 3/013; G06F 3/015
See application file for complete search history.

(56) References Cited

U.S. PATENT DOCUMENTS

| | | | | |
|---|---|---|---|---|
| 12,236,014 B2 * | 2/2025 | Yeo | .......................... | G06F 3/015 |
| 2019/0223746 A1 * | 7/2019 | Intrator | ................... | A61B 5/369 |
| 2021/0223864 A1 * | 7/2021 | Forsland | ................... | G06F 3/147 |
| 2022/0091671 A1 * | 3/2022 | Field | ........................ | G06F 3/011 |
| 2023/0018247 A1 * | 1/2023 | Elias | ....................... | G06V 20/20 |
| 2024/0427418 A1 * | 12/2024 | Yeo | ........................... | G06F 3/011 |

OTHER PUBLICATIONS

Alcaide, Ramses, et al., "EEG-Based Focus Estimation Using Neurable's Enten Headphones and Analytics Platform", bioRxiv preprint, https://doi.org/10.1101/2021.06.21.448991, (Jun. 24, 2021), 21 pgs.

Grosselin, Fanny, "Alpha activity neuromodulation induced by individual alpha-based neurofeedback learning in ecological context: a double-blind randomized study", Scientific Reports, 11:18489, (2021), 15 pgs.

Han, Chang-Hee, et al., "Brain-Switches for Asynchronous Brain-Computer Interfaces: A Systematic Review", Electronics 2020, 9, 422, doi: 10.3390/electronics9030422, (2020), 24 pgs.

(Continued)

*Primary Examiner* — Michael Pervan
(74) *Attorney, Agent, or Firm* — Schwegman Lundberg & Woessner, P.A.

(57) ABSTRACT

An extended Reality (XR) system is provided that monitors neurological signals to determine an engagement of a user with a real-world environment. The XR system continuously monitors neurological signals of a user through a processor operating in a low-power mode. The XR system generates an engagement signal by analyzing endogenous brain patterns in the neurological signals. In response to the engagement signal, the XR system activates environmental sensors to capture real-world environment data. The XR system generates contextual data from the captured environment data and determines XR content to provide to the user based on the contextual data. The XR system selectively activates XR capabilities to display the determined XR content.

20 Claims, 12 Drawing Sheets

(56) References Cited

OTHER PUBLICATIONS

Kato, Yasuhiro X, et al., "Development of a BCI master switch based on single-trial detection of contingent negative variation related potentials", 2011 Annual International Conference of the IEEE Engineering in Medicine and Biology Society, (Aug. 2011), 4629-4632.

Takagi, Yu, et al., "High-resolution image reconstruction with latent diffusion models from human brain activity", bioRxiv preprint, https://doi.org/10.1101/2022.11.18.517004, (Mar. 11, 2023), 11 pgs.

\* cited by examiner

BRAIN-AWARE EXTENDED REALITY

TECHNICAL FIELD

The present disclosure relates generally to data processing systems for monitoring neurological signals and generating signals and contextual data in extended reality systems.

BACKGROUND

A head-wearable apparatus can be implemented with a transparent or semi-transparent display through which a user of the head-wearable apparatus can view the surrounding environment. Such head-wearable apparatuses enable a user to see through the transparent or semi-transparent display to view the surrounding environment, and to also see objects (e.g., objects such as a rendering of a 2D or 3D graphic model, images, video, text, and so forth) that are generated for display to appear as a part of, and/or overlaid upon, the surrounding environment. This is typically referred to as "augmented reality" or "AR." A head-wearable apparatus can additionally completely occlude a user's visual field and display a virtual environment through which a user can move or be moved. This is typically referred to as "virtual reality" or "VR." In a hybrid form, a view of the surrounding environment is captured using cameras, and then that view is displayed along with augmentation to the user on displays the occlude the user's eyes. As used herein, the term extended Reality (XR) refers to augmented reality, virtual reality and any of hybrids of these technologies unless the context indicates otherwise.

A user of the head-wearable apparatus can access and use a computer software application to perform various tasks or engage in an activity. To use the computer software application, the user interacts with a user interface provided by the head-wearable apparatus.

BRIEF DESCRIPTION OF THE SEVERAL VIEWS OF THE DRAWINGS

In the drawings, which are not necessarily drawn to scale, like numerals can describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1A:
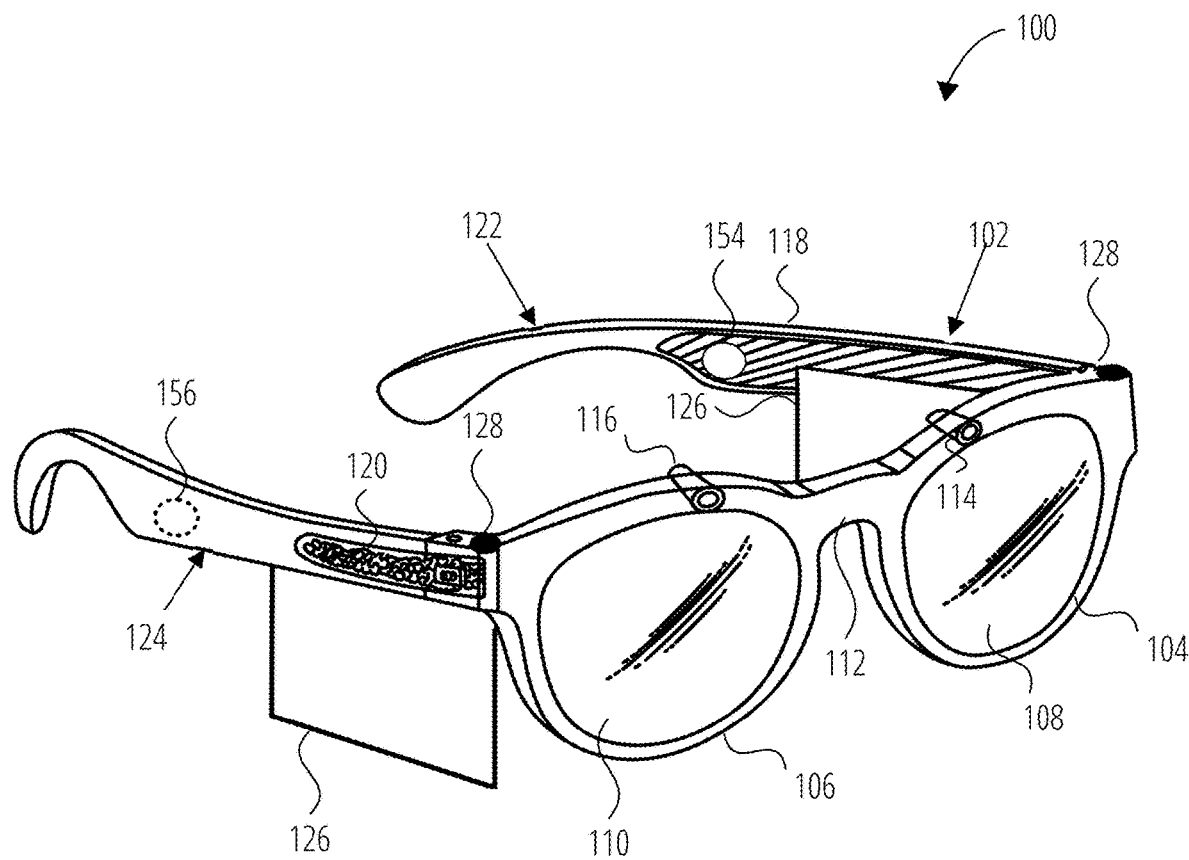
FIG. 1A is a perspective view of a head-wearable apparatus, according to some examples.

Some XR devices face power management challenges that constrain the practical usability of the XR systems. These devices may require either continuous operation of power-intensive systems like cameras and displays, or rely on explicit user interactions through buttons and touch controls to activate features. This results in excessive power consumption that reduces device longevity and creates a suboptimal user experience that interrupts natural interaction.

Some brain-computer interfaces have attempted to address these limitations but face several technical hurdles. These systems often require lengthy response times (e.g., of five or more seconds) to accurately detect user intent, struggle with significant variability in brain wave patterns between different users, and may rely on complicated motor imagery approaches that require extensive user training. Additionally, existing brain-computer interface solutions have not effectively integrated with the form factor constraints of everyday wearable devices.

Some current sensor integration approaches in XR devices lack efficient power management strategies. For example, keeping sensors continuously active drains power unnecessarily and requiring explicit user inputs to activate specific sensors interrupts an XR experience of the user. This creates a trade-off between functionality and battery life that limits the practical utility of these devices. Furthermore, existing solutions have not effectively combined multiple sensor inputs to accurately determine user intent while maintaining power efficiency.

The training and usability requirements of some brain-computer interface systems present additional barriers to widespread adoption. These systems may require extensive user training sessions to achieve reliable operation. They also face significant challenges in collecting and processing heterogeneous data, particularly when dealing with endogenous signals that lack explicit timing markers. This makes it difficult to validate user engagement and intent in real-world usage scenarios.

To address these limitations, the methodologies described in this disclosure provide a solution through a two-stage Brain Computer Interface (BCI) system that changes how an XR system manages power consumption and user interaction. An XR system in accordance with these methodologies continuously monitors brain activity in a low-power state, detecting engagement signals through endogenous brain patterns like alpha waves. When meaningful engagement is detected, the XR system activates a second stage that intelligently manages additional sensors and contextual analysis to determine appropriate content delivery.

In some examples, the methodologies described herein combine passive brain monitoring with multi-modal contextual analysis, enabling natural and intuitive XR interactions without requiring explicit user input. This approach integrates multiple data sources including brain activity and environmental sensors to accurately determine user intent while maintaining minimal power consumption. An XR system can provide subtle feedback through notifications to confirm user intent before activating full XR capabilities, and enable detection of shared engagement when multiple users focus on the same content.

In some examples, an XR system adapts to individual users and provides increasingly personalized responses, addressing the variability challenges present in current brain-computer interface implementations. By maintaining core brain monitoring in an efficient low-power state and selectively activating additional capabilities only when meaningful engagement is detected, the XR system achieves power savings as compared to continuously active systems. This approach enables practical everyday usability while overcoming the traditional limitations of both XR systems and brain-computer interfaces.

In some examples, the XR system continuously monitors neurological signals of a user through at least one processor operating in a low-power mode to efficiently processes neurological signals while maintaining minimal power consumption to enable continuous monitoring of brain activity without significant battery drain. The XR system generates an engagement signal by analyzing endogenous brain patterns like alpha waves in the neurological signals to detect when meaningful engagement occurs. When engagement is detected, the XR system activates environmental sensors to capture real-world environment data, including visual information through one or more cameras, audio data from one or more audio sensors, pose sensor data from one or more pose sensors, eye tracking data from one or more eye tracking sensors, and Global Position System (GPS) data from one or more GPS sensors. The XR system processes this multimodal sensor data to generate contextual data that provides a comprehensive understanding of the real-world environment. The XR system uses the contextual data to determine appropriate XR content and applications that match the user's current engagement and environment. The XR system then selectively activates specific XR capabilities to provide the determined XR content through an XR user interface.

In some examples, the XR system tracks eye movements of a user through environmental sensors that include cameras and eye tracking sensors to detect the position and orientation of the user's eyes and corresponding gaze positions. The XR system combines this eye tracking data with the neurological signals, where the eye tracking performs targeting functions while the neurological signals provide intent detection, enabling the XR system to generate an engagement signal that indicates meaningful user interaction rather than passive observation.

In some examples, the XR system implements a two-stage feedback process to confirm user intent before fully activating XR capabilities. The XR system provides initial feedback through notifications like audio sounds, fixed display notifications, or haptic feedback when engagement is first detected. The XR system analyzes the user's neurological signals in response to these notifications to validate the user's intent. This neurological response analysis creates a neural feedback loop where the XR system can detect confirmation signals in the brain activity patterns to determine whether to proceed with activating full XR capabilities.

In some examples, the XR system implements shared engagement detection through multiple coordinated XR systems. The XR system uses communication components to detect the presence of other users wearing additional XR systems in proximity to the XR system. Respective engagement determination engines of the XR systems communicate respective engagement signals and real-world environment data and analyze the engagement signals to identify synchronized engagement with the real-world environment. The XR system processes this synchronized engagement activity to determine when multiple users are engaged with the same content or environmental elements. This shared engagement detection can be used to enhance social interactions and provide contextually relevant content to groups of users who demonstrate synchronized engagement patterns.

In some examples, the XR system implements a two-stage machine learning approach for detecting user engagement and intent. The XR system uses a first machine learning model to generate a continuous engagement value ranging from zero to one that monitors the user's overall engagement level. Concurrently, a second machine learning model operates to detect specific user intent, functioning as a brain-based click mechanism that can determine when a user intends to interact versus casual observation.

Other technical features can be readily apparent to one skilled in the art from the following figures, descriptions, and claims.

FIG. 1A is a perspective view of a head-wearable apparatus 100 according to some examples. The head-wearable apparatus 100 can be a client device of an XR system, such as a computing system 602 of FIG. 6. The head-wearable apparatus 100 can include a frame 102 made from any suitable material such as plastic or metal, including any suitable shape memory alloy. In one or more examples, the frame 102 includes a first or left optical element holder 104 (e.g., a display or lens holder) and a second or right optical element holder 106 connected by a bridge 112. A first or left optical element 108 and a second or right optical element 110 can be provided within respective left optical element holder 104 and right optical element holder 106. The right optical element 110 and the left optical element 108 can be a lens, a display, a display assembly, or a combination of the foregoing. Any suitable display assembly can be provided in the head-wearable apparatus 100.

The frame 102 additionally includes a left arm or left temple piece 122 and a right arm or right temple piece 124. In some examples the frame 102 can be formed from a single piece of material so as to have a unitary or integral construction.

The head-wearable apparatus 100 can include a computing device, such as a computer 120, which can be of any suitable type so as to be carried by the frame 102 and, in one or more examples, of a suitable size and shape, so as to be partially disposed in one of the left temple piece 122 or the right temple piece 124. The computer 120 can include one or more processors with memory, wireless communication circuitry, and a power source. As discussed below, the computer 120 comprises low-power circuitry 226, high-speed circuitry 228, and a display processor. Various other examples can include these elements in different configurations or integrated together in different ways. Additional details of aspects of the computer 120 can be implemented as illustrated by the machine 300 discussed herein.

The computer 120 additionally includes a battery 118 or other suitable portable power supply. In some examples, the battery 118 is disposed in left temple piece 122 and is electrically coupled to the computer 120 disposed in the right temple piece 124. The head-wearable apparatus 100 can include a connector or port (not shown) suitable for charging the battery 118, a wireless receiver, transmitter or transceiver (not shown), or a combination of such devices.

The head-wearable apparatus 100 includes a first or left camera 114 and a second or right camera 116. Although two cameras are depicted, other examples contemplate the use of a single or additional (i.e., more than two) cameras.

In some examples, the head-wearable apparatus 100 includes any number of input sensors or other input/output devices in addition to the left camera 114 and the right camera 116. Such sensors or input/output devices can additionally include biometric sensors, location sensors, motion sensors, and so forth.

In some examples, the left camera 114 and the right camera 116 provide tracking image data for use by the head-wearable apparatus 100 to extract 3D information from a real-world scene.

The head-wearable apparatus 100 can also include a touchpad 126 mounted to or integrated with one or both of the left temple piece 122 and right temple piece 124. The touchpad 126 is generally vertically-arranged, approximately parallel to a user's temple in some examples. As used herein, generally vertically aligned means that the touchpad is more vertical than horizontal, although potentially more vertical than that. Additional user input can be provided by one or more buttons 128, which in the illustrated examples are provided on the outer upper edges of the left optical element holder 104 and right optical element holder 106. The one or more touchpads 126 and buttons 128 provide a means whereby the head-wearable apparatus 100 can receive input from a user of the head-wearable apparatus 100.

Figure 1B:
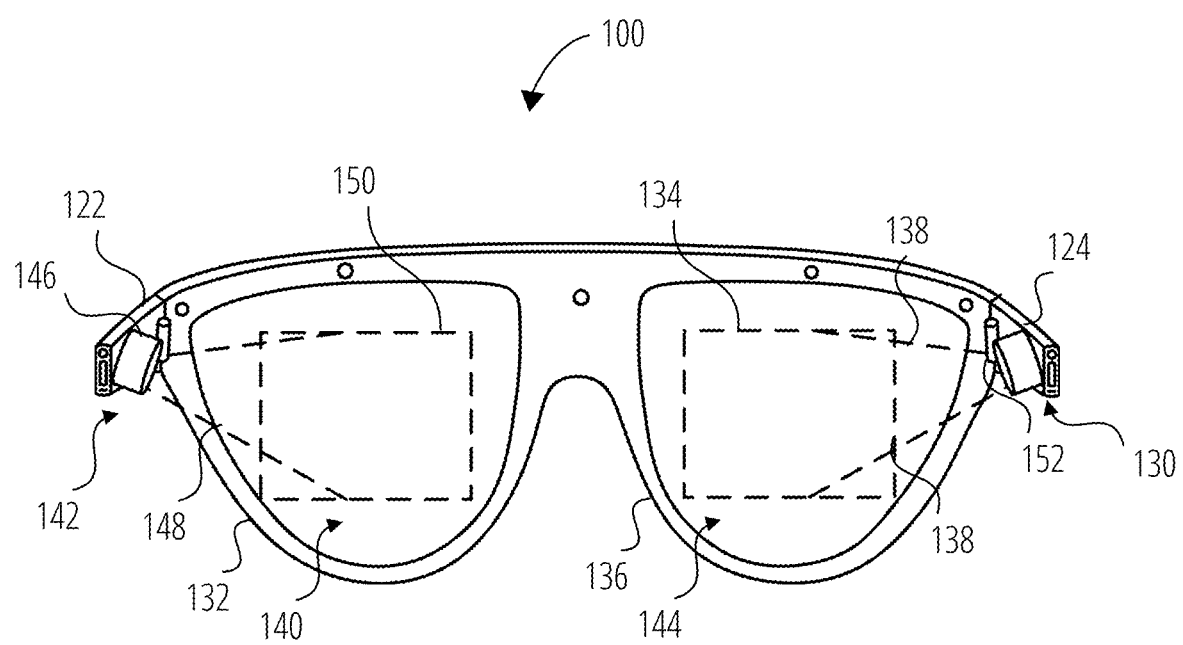
FIG. 1B illustrates a further view of the head-wearable apparatus of FIG. 1A, according to some examples.

FIG. 1B illustrates the head-wearable apparatus 100 from the perspective of a user while wearing the head-wearable apparatus 100. For clarity, a number of the elements shown in FIG. 1A have been omitted. As described in FIG. 1A, the head-wearable apparatus 100 shown in FIG. 1B includes left optical element 140 and right optical element 144 secured within the left optical element holder 132 and the right optical element holder 136 respectively.

The head-wearable apparatus 100 includes right forward optical assembly 130 comprising a left near eye display 150, a right near eye display 134, and a left forward optical assembly 142 including a left projector 146 and a right projector 152.

In some examples, the near eye displays are waveguides. The waveguides include reflective or diffractive structures (e.g., gratings and/or optical elements such as mirrors, lenses, or prisms). Light 138 emitted by the right projector 152 encounters the diffractive structures of the waveguide of the right near eye display 134, which directs the light towards the right eye of a user to provide an image on or in the right optical element 144 that overlays the view of the real-world scene seen by the user. Similarly, light 148 emitted by the left projector 146 encounters the diffractive structures of the waveguide of the left near eye display 150, which directs the light towards the left eye of a user to provide an image on or in the left optical element 140 that overlays the view of the real-world scene seen by the user. The combination of a Graphical Processing Unit, an image display driver, the right forward optical assembly 130, the left forward optical assembly 142, left optical element 140, and the right optical element 144 provide an optical engine of the head-wearable apparatus 100. The head-wearable apparatus 100 uses the optical engine to generate an overlay of the real-world scene view of the user including display of a user interface to the user of the head-wearable apparatus 100.

It will be appreciated however that other display technologies or configurations can be utilized within an optical engine to display an image to a user in the user's field of view. For example, instead of a projector and a waveguide, an LCD, LED or other display panel or surface can be provided.

In use, a user of the head-wearable apparatus 100 will be presented with information, content and various user interfaces on the near eye displays. As described in more detail herein, the user can then interact with the head-wearable apparatus 100 using a touchpad 126 and/or the button 128, voice inputs or touch inputs on an associated device (e.g. mobile device 214 illustrated in FIG. 2), and/or hand movements, locations, and positions recognized by the head-wearable apparatus 100.

In some examples, an optical engine of an XR system is incorporated into a lens that is in contact with a user's eye, such as a contact lens or the like. The XR system generates images of an XR experience using the contact lens.

In some examples, the head-wearable apparatus 100 includes components of a Brain Computer Interface (BCI) for detecting neurological signals while maintaining its form factor as spectacles. For example, the head-wearable apparatus 100 can include electrodes positioned in specific locations to enable effective neurological signal detection, such as electrode 154 and electrode 156.

In some examples, the frame 102 of the head-wearable apparatus 100 includes a left temple piece 122 and a right temple piece 124 that can incorporate flexible electrodes for detecting neurological signals. These temple pieces are designed to maintain contact with the user's skin near the ears while preserving the conventional eyeglasses form factor.

In some examples, the head-wearable apparatus 100 can include sensors integrated into the nose pads and regions of a user's head covered by the design of the head-wearable apparatus 100. In some examples, the electrode placement is constrained to locations that are covered by the spectacle design of the head-wearable apparatus 100, including along the temples and on the nose pads, where measurements of brain activity can be obtained either through direct contact between the electrode and skin or through distance sensing capabilities.

In some examples, the computer 120 of the head-wearable apparatus 100 implements signal processing to handle variable contact conditions across different anatomical regions. This includes compensating for unequal sensor contact across temple regions and maintaining signal detection capability during variable contact conditions. In some examples, the computer 120 can validate signal quality at different positions and implement position-specific signal processing to ensure reliable neurological signal detection.

In some examples, the computer 120 includes low-power circuitry 226 specifically designed to efficiently process neurological signals while maintaining minimal power consumption. This enables continuous monitoring of brain activity without significant battery drain.

In some examples, the head-wearable apparatus 100 comprises an XR system. In some examples, the head-wearable apparatus 100 is a component of an XR system including additional computational components. In some examples, the head-wearable apparatus 100 is a component in an XR system comprising additional user input systems or devices.

System with Head-Wearable Apparatus

Figure 2:
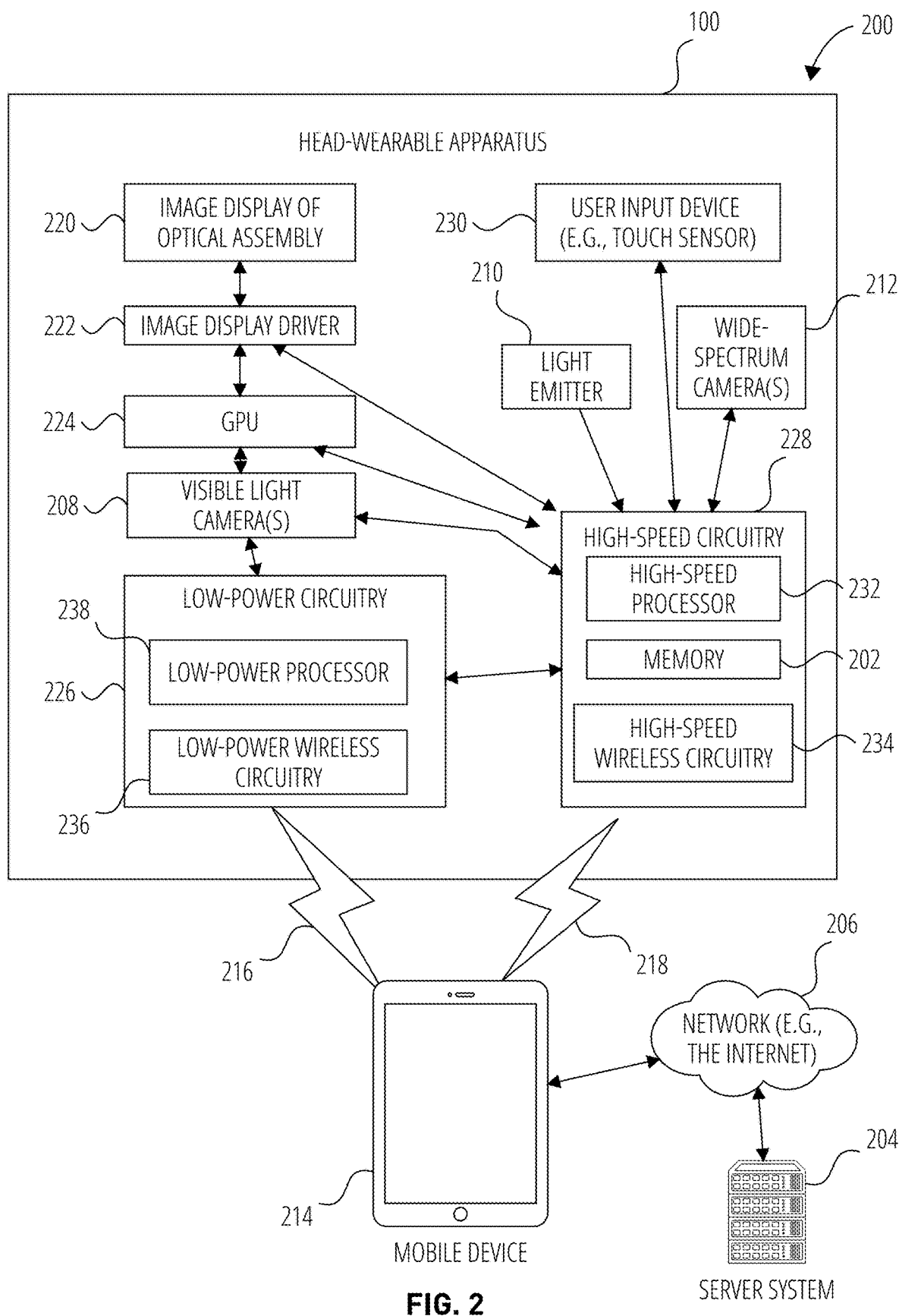
FIG. 2 illustrates a system of a head-wearable apparatus, according to some examples.

FIG. 2 illustrates a system 200 including a head-wearable apparatus 100, according to some examples. FIG. 2 is a high-level functional block diagram of an example head-wearable apparatus 100 communicatively coupled to a mobile device 214 and various server systems 204 (e.g., the interaction server system 610) via various networks 608.

The head-wearable apparatus 100 includes one or more cameras, each of which can be, for example, one or more camera 208, a light emitter 210, and one or more wide-spectrum cameras 212.

The mobile device 214 connects with head-wearable apparatus 100 using both a low-power wireless connection 216 and a high-speed wireless connection 218. In some examples, the mobile device 214 is also operable to connect to the server system 204 and the network 206.

The head-wearable apparatus 100 further includes two image displays of the image display of optical assembly 220. The two image displays of optical assembly 220 include one associated with the left lateral side and one associated with the right lateral side of the head-wearable apparatus 100. The head-wearable apparatus 100 also includes an image display driver 222, and a GPU 224. The image display of optical assembly 220, image display driver 222, and GPU 224 constitute an optical engine of the head-wearable apparatus 100. The image display of optical assembly 220 is for presenting images and videos, including an image that can include a graphical user interface to a user of the head-wearable apparatus 100.

The image display driver 222 commands and controls the image display of optical assembly 220. The image display driver 222 can deliver image data directly to the image display of optical assembly 220 for presentation or can convert the image data into a signal or data format suitable for delivery to the image display device. For example, the image data can be video data formatted according to compression formats, such as H.264 (MPEG-4 Part 10), HEVC, Theora, Dirac, RealVideo RV40, VP8, VP9, or the like, and still image data can be formatted according to compression formats such as Portable Network Group (PNG), Joint Photographic Experts Group (JPEG), Tagged Image File Format (TIFF) or exchangeable image file format (EXIF) or the like.

The head-wearable apparatus 100 includes a frame and stems (or temples) extending from a lateral side of the frame. The head-wearable apparatus 100 further includes a user input device 230 (e.g., touch sensor or push button), including an input surface on the head-wearable apparatus 100. The user input device 230 (e.g., touch sensor or push button) is to receive from the user an input selection to manipulate the graphical user interface of the presented image.

The components shown in FIG. 2 for the head-wearable apparatus 100 are located on one or more circuit boards, for example a PCB or flexible PCB, in the rims or temples. Alternatively, or additionally, the depicted components can be located in the chunks, frames, hinges, or bridge of the head-wearable apparatus 100. Left and right cameras 208 can include digital camera elements such as a complementary metal oxide-semiconductor (CMOS) image sensor, charge-coupled device, camera lenses, or any other respective visible or light-capturing elements that can be used to capture data, including images of scenes with unknown objects.

The head-wearable apparatus 100 includes a memory 202, which stores instructions to perform a subset or all of the functions described herein. The memory 202 can also include storage device.

As shown in FIG. 2, the high-speed circuitry 228 includes a high-speed processor 232, a memory 202, and high-speed wireless circuitry 234. In some examples, the image display driver 222 is coupled to the high-speed circuitry 228 and operated by the high-speed processor 232 in order to drive the left and right image displays of the image display of optical assembly 220. The high-speed processor 232 can be any processor capable of managing high-speed communications and operation of any general computing system used for the head-wearable apparatus 100. The high-speed processor 232 includes processing resources used for managing high-speed data transfers on a high-speed wireless connection 218 to a wireless local area network (WLAN) using the high-speed wireless circuitry 234. In some examples, the high-speed processor 232 executes an operating system such as a LINUX operating system or other such operating system of the head-wearable apparatus 100, and the operating system is stored in the memory 202 for execution. In addition to any other responsibilities, the high-speed processor 232 executing a software architecture for the head-wearable apparatus 100 is used to manage data transfers with high-speed wireless circuitry 234. In some examples, the high-speed wireless circuitry 234 is configured to implement Institute of Electrical and Electronic Engineers (IEEE) 802.11 communication standards, also referred to herein as WiFi. In some examples, other high-speed communications standards can be implemented by the high-speed wireless circuitry 234.

The low-power wireless circuitry 236 and the high-speed wireless circuitry 234 of the head-wearable apparatus 100 can include short-range transceivers (Bluetooth™) and wireless wide, local, or wide area network transceivers (e.g., cellular or WiFi). Mobile device 214, including the transceivers communicating via the low-power wireless connection 216 and the high-speed wireless connection 218, can be implemented using details of the architecture of the head-wearable apparatus 100, as can other elements of the network 206.

The memory 202 includes any storage device capable of storing various data and applications, including, among other things, camera data generated by the left and right cameras 208, the wide-spectrum cameras 212, and the GPU 224, as well as images generated for display by the image display driver 222 on the image displays of the image display of optical assembly 220. While the memory 202 is shown as integrated with high-speed circuitry 228, in some examples, the memory 202 can be an independent stand-alone element of the head-wearable apparatus 100. In some such examples, electrical routing lines can provide a connection through a chip that includes the high-speed processor 232 from the GPU 224 or the low-power processor 238 to the memory 202. In some examples, the high-speed processor 232 can manage addressing of the memory 202 such that the low-power processor 238 will boot the high-speed processor 232 any time that a read or write operation involving memory 202 is needed.

As shown in FIG. 2, the low-power processor 238 or high-speed processor 232 of the head-wearable apparatus 100 can be coupled to the camera (camera 208, light emitter 210, or wide-spectrum cameras 212), the image display driver 222, the user input device 230 (e.g., touch sensor or push button), and the memory 202.

The head-wearable apparatus 100 is connected to a host computer. For example, the head-wearable apparatus 100 is paired with the mobile device 214 via the high-speed wireless connection 218 or connected to the server system 204 via the network 206. The server system 204 can be one or more computing devices as part of a service or network computing system, for example, that includes a processor, a memory, and network communication interface to communicate over the network 206 with the mobile device 214 and the head-wearable apparatus 100.

The mobile device 214 includes a processor and a network communication interface coupled to the processor. The network communication interface allows for communication over the network 206, low-power wireless connection 216, or high-speed wireless connection 218. Mobile device 214 can further store at least portions of the instructions for generating binaural audio content in the mobile device 214's memory to implement the functionality described herein.

Output components of the head-wearable apparatus 100 include visual components, such as a display such as a liquid crystal display (LCD), a plasma display panel (PDP), a light-emitting diode (LED) display, a projector, or a waveguide. The image displays of the optical assembly are driven by the image display driver 222. The output components of the head-wearable apparatus 100 further include acoustic components (e.g., speakers), haptic components (e.g., a vibratory motor), other signal generators, and so forth. The input components of the head-wearable apparatus 100, the mobile device 214, and server system 204, such as the user input device 230, can include alphanumeric input components (e.g., a keyboard, a touch surface configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch surface that provides location and force of touches or touch gestures, or other tactile input components), audio input components (e.g., a microphone), and the like.

The head-wearable apparatus 100 can also include additional peripheral device elements. Such peripheral device elements can include biometric sensors, additional sensors, or display elements integrated with the head-wearable apparatus 100. For example, peripheral device elements can include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a GPS receiver component), Wi-Fi or Bluetooth™ transceivers to generate positioning system coordinates, altitude sensor components (e.g., altimeters or barometers that detect air pressure from which altitude can be derived), orientation sensor components (e.g., magnetometers), and the like. Such positioning system coordinates can also be received over low-power wireless connections 216 and high-speed wireless connection 218 from the mobile device 214 via the low-power wireless circuitry 236 or high-speed wireless circuitry 234.

Figure 3:
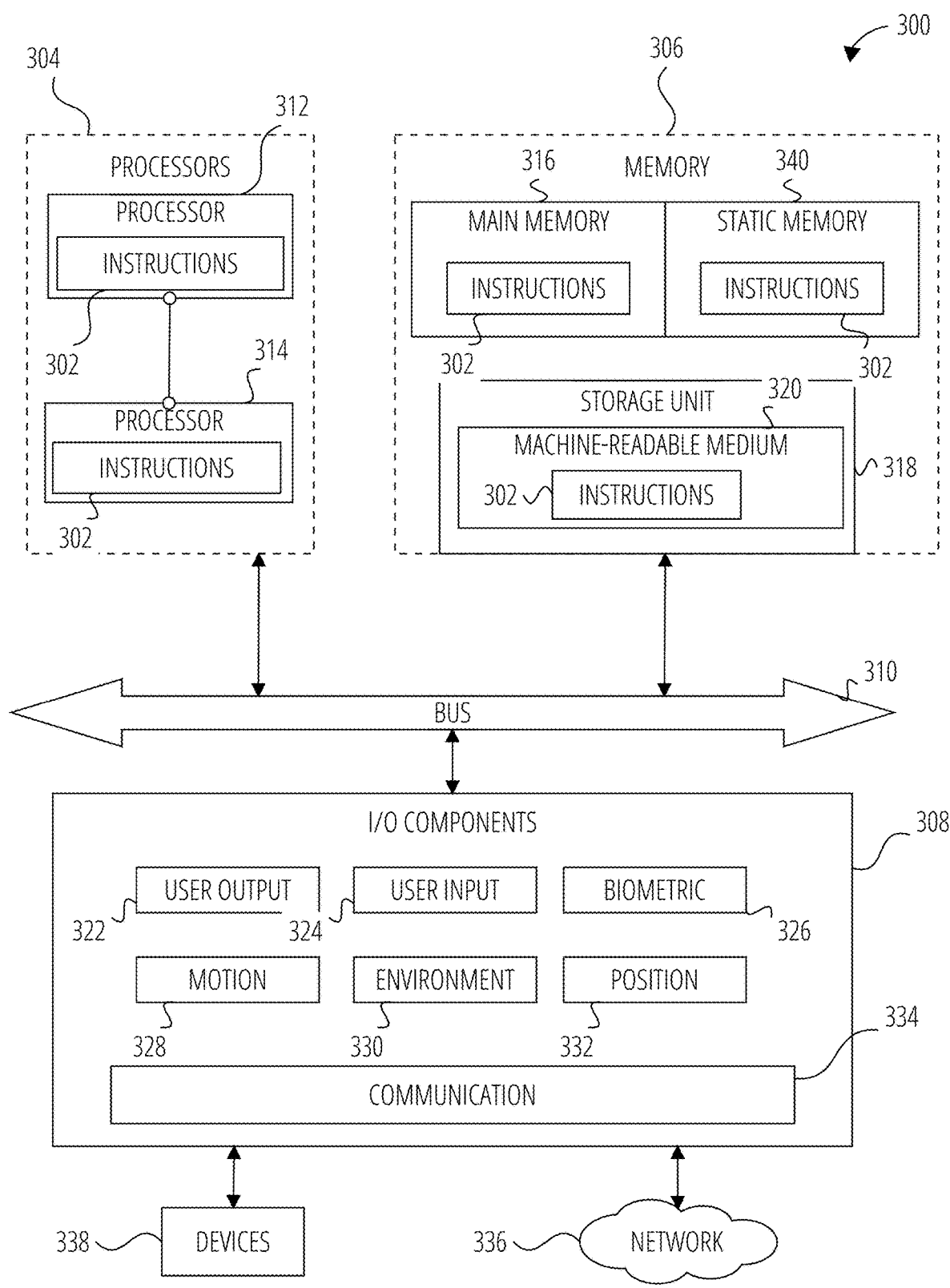
FIG. 3 is a diagrammatic representation of a machine within which a set of instructions can be executed to cause the machine to perform any one or more of the methodologies discussed herein, according to some examples.

FIG. 3 is a diagrammatic representation of the machine 300 within which instructions 302 (e.g., software, a program, an application, an applet, an app, or other executable code) for causing the machine 300 to perform any one or more of the methodologies discussed herein can be executed. For example, the instructions 302 can cause the machine 300 to execute any one or more of the methods described herein. The instructions 302 transform the general, non-programmed machine 300 into a particular machine 300 programmed to carry out the described and illustrated functions in the manner described. The machine 300 can operate as a standalone device or can be coupled (e.g., networked) to other machines. In a networked deployment, the machine 300 can operate in the capacity of a server machine or a client machine in a server-client network environment, or as a peer machine in a peer-to-peer (or distributed) network environment. The machine 300 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 302, sequentially or otherwise, that specify actions to be taken by the machine 300. Further, while a single machine 300 is illustrated, the term "machine" shall also be taken to include a collection of machines that individually or jointly execute the instructions 302 to perform any one or more of the methodologies discussed herein. The machine 300, for example, can comprise the computing system 602 or any one of multiple server devices forming part of the interaction server system 610. In some examples, the machine 300 can also comprise both client and server systems, with specified operations of a particular method or algorithm being performed on the server-side and with specified operations of the particular method or algorithm being performed on the client-side.

The machine 300 can include processors 304, memory 306, and input/output I/O components 308, which can be configured to communicate with each other via a bus 310. In an example, the processors 304 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, a processor 312 and a processor 314 that execute the instructions 302. The term "processor" is intended to include multi-core processors that can comprise two or more independent processors (sometimes referred to as "cores") that can execute instructions contemporaneously. Although FIG. 3 shows multiple processors 304, the machine 300 can include a single processor with a single-core, a single processor with multiple cores (e.g., a multi-core processor), multiple processors with a single core, multiple processors with multiples cores, or any combination thereof.

The memory 306 includes a main memory 316, a static memory 340, and a storage unit 318, both accessible to the processors 304 via the bus 310. The main memory 306, the static memory 340, and storage unit 318 store the instructions 302 embodying any one or more of the methodologies or functions described herein. The instructions 302 can also reside, completely or partially, within the main memory 316, within the static memory 340, within machine-readable medium 320 within the storage unit 318, within at least one of the processors 304 (e.g., within the processor's cache memory), or any suitable combination thereof, during execution thereof by the machine 300.

The I/O components 308 can include a wide variety of components to receive input, provide output, produce output, transmit information, exchange information, capture measurements, and so on. The specific I/O components 308 that are included in a particular machine will depend on the type of machine. For example, portable machines such as mobile phones can include a touch input device or other such input mechanisms, while a headless server machine will likely not include such a touch input device. It will be appreciated that the I/O components 308 can include many other components that are not shown in FIG. 3. In various examples, the I/O components 308 can include user output components 322 and user input components 324. The user output components 322 can include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 324 can include alphanumeric input components (e.g., a keyboard, a touch surface configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch surface that provides location and force of touches or touch gestures, or other tactile input components), audio input components (e.g., a microphone), and the like.

In further examples, the I/O components 308 can include biometric components 326, motion components 328, environmental components 330, or position components 332, among a wide array of other components. For example, the biometric components 326 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 328 include acceleration sensor components (e.g., accelerometer), gravitation sensor components, rotation sensor components (e.g., gyroscope).

In some examples, the biometric components include a brain-machine interface (BMI) system that allows communication between the brain and an external device or machine. This can be achieved by recording brain activity data, translating this data into a format that can be understood by a computer, and then using the resulting signals to control the device or machine.

Example types of BMI technologies, include:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components 326 is captured and stored only with user approval and deleted on user request, and in accordance with applicable laws. Further, such biometric data can be used for very limited purposes, such as identification verification. To ensure limited and authorized use of biometric information and other Personally Identifiable Information (PII), access to this data is restricted to authorized personnel only, if at all. Any use of biometric data can strictly be limited to identification verification purposes, and the data is not shared or sold to any third party without the explicit consent of the user. Any biometric data is permanently deleted or otherwise destroyed when the initial purpose for collecting or obtaining the biometric data has been satisfied. In addition, appropriate technical and organizational measures are implemented to ensure the security and confidentiality of this sensitive information as more fully described in reference to FIG. 9.

The environmental components 330 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), depth or distance sensors (e.g., sensors to determine a distance to an object or a depth in a 3D coordinate system of features of an object), or other components that can provide indications, measurements, or signals corresponding to a surrounding physical environment.

The position components 332 include location sensor components (e.g., a GPS receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 308 further include communication components 334 operable to couple the machine 300 to a network 336 or devices 338 via respective coupling or connections. For example, the communication components 334 can include a network interface component or another suitable device to interface with the network 336. In further examples, the communication components 334 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 338 can be another machine or any of a wide variety of peripheral devices (e.g., a peripheral device coupled via a USB).

Moreover, the communication components 334 can detect identifiers or include components operable to detect identifiers. For example, the communication components 334 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 334, such as location via Internet Protocol (IP) geolocation, location via Wi-Fi® signal triangulation, location via detecting an NFC beacon signal that can indicate a particular location, and so forth.

The various memories (e.g., main memory 316, static memory 340, and memory of the processors 304) and storage unit 318 can store one or more sets of instructions and data structures (e.g., software) embodying or used by any one or more of the methodologies or functions described herein. These instructions (e.g., the instructions 302), when executed by processors 304, cause various operations to implement the disclosed examples.

The instructions 302 can be transmitted or received over the network 336, using a transmission medium, via a network interface device (e.g., a network interface component included in the communication components 334) and using any one of several well-known transfer protocols (e.g., hypertext transfer protocol (HTTP)). Similarly, the instructions 302 can be transmitted or received using a transmission medium via a coupling (e.g., a peer-to-peer coupling) to the devices 338.

Figure 4A:
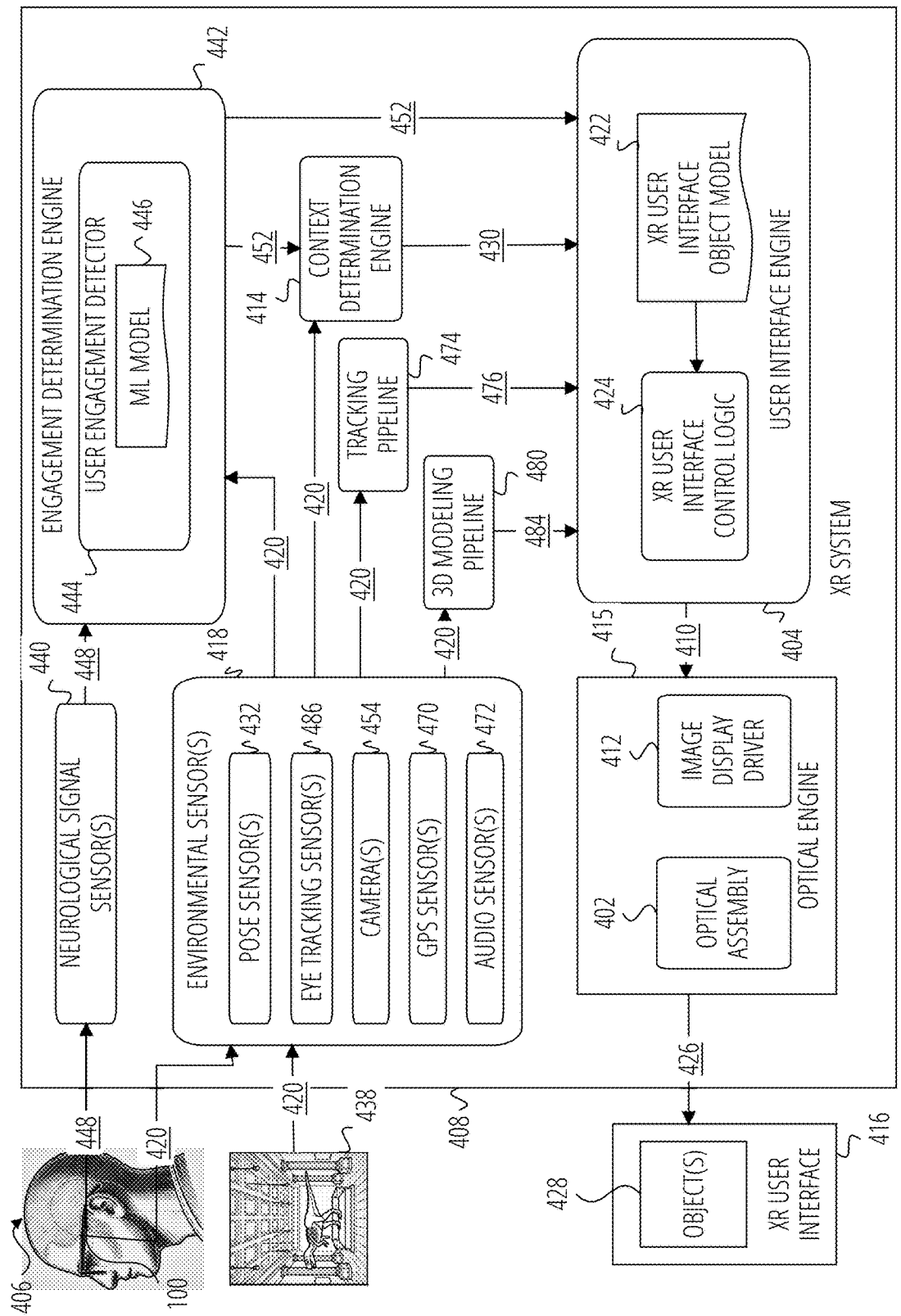
FIG. 4A illustrates a collaboration diagram of components of an XR system, according to some examples.
Figure 4B:
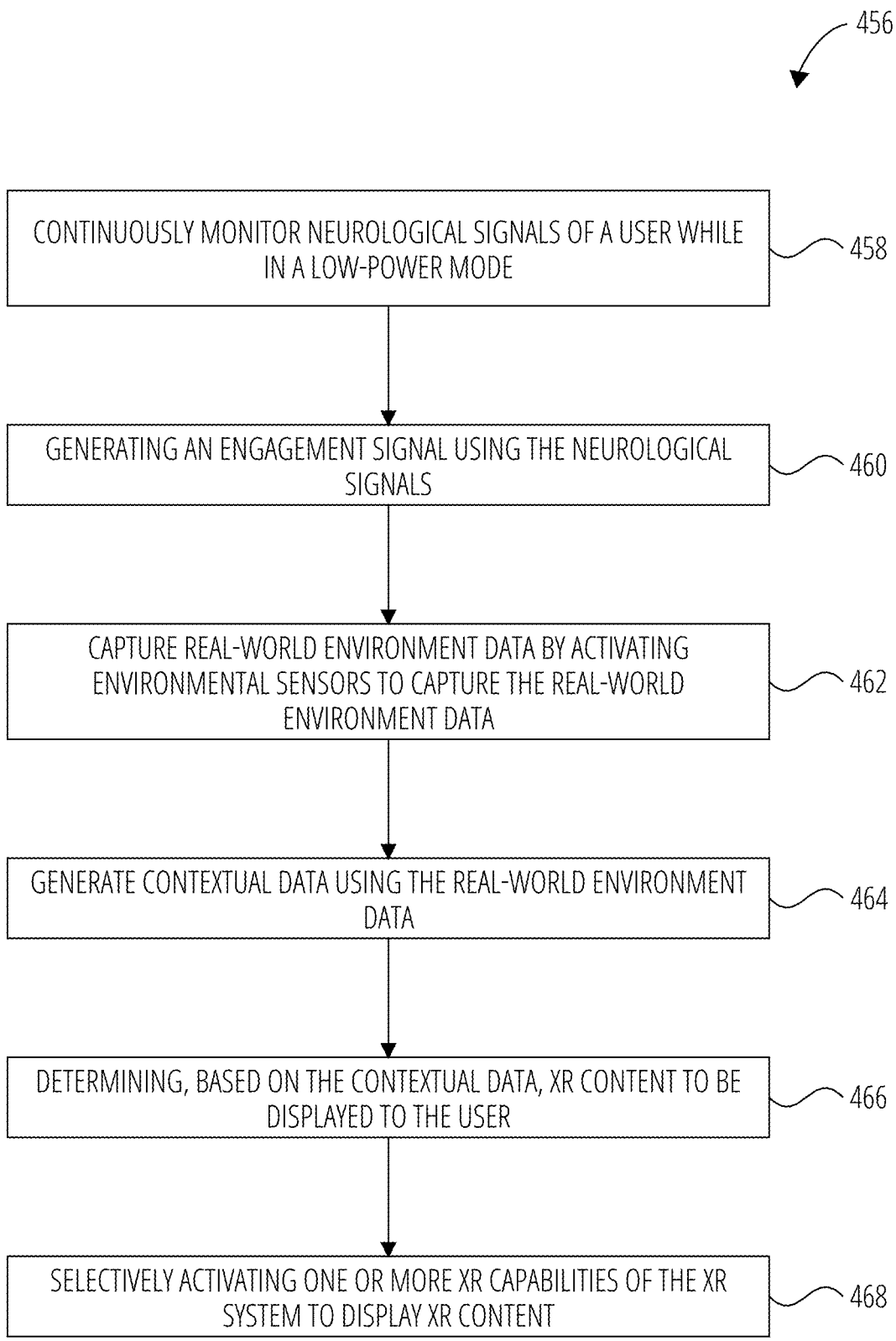
FIG. 4B illustrates a user engagement determination method, according to some examples.

FIG. 4A illustrates a collaboration diagram of components of an XR system 408 using neurological signals for determining user engagement with a real world environment 438 and with virtual content provided in an XR user interface 416. FIG. 4B illustrates an example user engagement determination method 456 for detecting user engagement with a real world or virtual environment, according to some examples. Although the example user engagement determination method 456 depicts a particular sequence of operations, the sequence may be altered without departing from the scope of the present disclosure. For example, some of the operations depicted may be performed in parallel or in a different sequence that does not materially affect the function of the user engagement determination method 456. In other examples, different components of an XR system 408 that implement the user engagement determination method 456 may perform functions at substantially the same time or in a specific sequence.

In operation 458, the XR system 408 continuously monitors neurological signals 448 of a user 406 while operating in a low-power mode. For example, the XR system 408 using an engagement determination engine 442 that continuously monitors neurological signals 448 of the user 406 using one or more neurological signal sensors 440 using a processor operating in a low power mode and one or more neurological signal sensors 440 operating in a low power mode. The one or more neurological signal sensors 440 are mounted on a head-wearable apparatus 100 worn by the user 406. The one or more neurological signal sensors 440 communicate the neurological signals 448 to the engagement determination engine 442. The engagement determination engine 442 receives the neurological signals 448 and uses a user engagement detector 444 having a Machine Learning (ML) model 446 to detect that the user 406 is paying attention to something within a real-world environment 438. For example, the engagement determination engine 442 processes neurological signals 448 from the neurological signal sensors 440 to detect user attention and engagement. To do so, the engagement determination engine 442 implements a user engagement detector 444 that uses the ML model 446 trained to recognize patterns in brain activity indicating focused attention. When processing the neurological signals 448, the user engagement detector 444 analyzes features like alpha waves and other endogenous brain rhythms to determine if the user 406 is actively engaging with objects or content in their real-world environment 438. The training and use of the ML model 446 is more fully described in reference to FIG. 5A and FIG. 5B.

In some examples, the user engagement detector 444 combines the neurological signal analysis with contextual information from environmental sensors to validate detected engagement. The ML model 446 can process multiple input streams including, but not limited to, electroencephalography (EEG) data, eye tracking data, hand tracking data, Inertial Measurement Unit (IMU) data, camera data, and sensor data to accurately determine when the user 406 is meaningfully engaging with their surroundings versus casual observation.

In additional examples, the engagement determination engine 442 operates continuously in a low-power mode to efficiently monitor brain activity patterns. For example, a low-power mode may be implemented using a neuromorphic system including one or more neuromorphic processors. Neuromorphic systems may include, but are not limited to, computing systems designed to mimic the structure and function of the human brain. The training and use of a ML model of a neuromorphic system is more fully described in reference to FIG. 5A and FIG. 5B.

In some examples, a low-power mode includes operating a processor at different frequency modes based on processing requirements. For example, while operating in a low-power state, one or more processors of the XR system 408 operate at a clock frequency lower than a clock frequency that the XR system 408 operates in a normal power state. By maintaining a low-power state, the XR system 408 effectively balances performance with energy efficiency, allowing for prolonged operation and user interaction within an XR environment.

In operation 460, the engagement determination engine 442 generates an engagement signal 452 from the neurological signals 448. For example, the user engagement detector 444 can detect subtle changes in brain wave patterns as engagement markers that indicate when a user transitions from passive observation to active engagement with objects or content in their real-world environment 438. When the user engagement detector 444 determines that a level of engagement meets a specified threshold value, the engagement determination engine 442 generates an engagement signal 452 and communicates the engagement signal 452 to a user interface engine 404 and a context determination engine 414.

In some examples, an engagement marker includes naturally occurring brain activity patterns that the engagement determination engine 442 can detect and analyze without requiring external stimuli or explicit user actions. In some examples, alpha waves are detected, which reflect synchronous firing of neuronal clusters at a frequency of 8-13 Hz and serve as a proxy for attention and focus.

In some examples, the engagement determination engine 442 tracks eye movements of a user through environmental sensors 418 that can include cameras 454 and eye tracking sensors 486 to detect the position and orientation of the user's eyes. The engagement determination engine 442 distinguishes between casual eye movements and intentional eye movement patterns by analyzing associated brain response patterns in the neurological signals 448. The engagement determination engine 442 generates the engagement signal 452 using the intentional eye movement patterns and the neurological signals 448 that is transmitted to the context determination engine 414 and the user interface engine 404.

In additional examples, the engagement determination engine 442 implements a two-stage process where an initial spike in engagement from the neurological signals triggers brief activation of one or more eye tracking sensors 486 to determine what objects the user was looking at during the engagement spike.

In some examples, the engagement signal 452 includes additional data about a level of engagement including, but not limited to, a confidence interval determined by the ML model 446 of the degree of engagement of the user 406 with the real-world environment 438, a strength of engagement of the user 406, and the like.

In additional examples, the ML model 446 is trained to recognize engagement signals from heterogeneous brain signal data collected across multiple users. The ML model 446 is adapted to account for inter-individual variability in brain patterns and can be personalized through user-specific fine-tuning to accurately detect engagement signals despite differences in how individual users' brains respond.

In some examples, the engagement determination engine 442 implements a two-stage machine learning approach for detecting user engagement and intent. The engagement determination engine 442 uses a (first) continuous engagement monitoring ML model to generate a continuous engagement value having a specified range, (e.g., ranging from zero to one or the like) that monitors the user's overall engagement level. Concurrently, a (second) intent detection ML model operates to detect specific user intent, functioning as a brain-based click mechanism. The engagement determination engine 442 combines the outputs from both ML models—the continuous engagement monitoring ML model and the intent detection ML model—to generate the engagement signal 452.

This approach enables the engagement determination engine 442 to distinguish between casual interest and intentional engagement.

In some examples, the intent detection ML model generates a continuous value indicating an intent of a user. The intent detection ML model determines the user's intent based on the continuous value meeting or exceeding a threshold value.

In some examples, the intent detection ML model is a classifier that indicates an intent of a user. For example, the intent detection ML model generates a binary value indicating an intent of the user and a confidence level for the binary value.

In some examples, the XR system 408 implements shared engagement detection through one or more additional XR systems. The XR system 408 uses communication components 334 (of FIG. 3) to detect the presence of other users wearing additional XR systems in proximity to the XR system 408. Respective engagement determination engines of the XR systems communicate respective engagement signals and real-world environment data and analyzes the engagement signals to identify synchronized engagement with the real-world environment 438. The XR system 408 processes this synchronized engagement activity to determine when multiple users are engaged with the same content or environmental elements. This shared engagement detection can be used to enhance social interactions and provide contextually relevant content to groups of users who demonstrate synchronized engagement patterns. The XR system can integrate this shared engagement information with other contextual data through the user interface engine 404 to determine appropriate XR content for multiple synchronized users.

In some examples, the XR system 408 and the additional XR system exchange respective neurological signals and the XR systems determine a shared engagement signal using the respective neurological signals.

In some examples, the engagement determination engine 442 implements a two-stage feedback process to confirm user intent before fully activating XR capabilities of the XR system 408. The engagement determination engine 442 provides initial feedback through notifications like audio sounds, fixed display notifications, or haptic feedback when engagement is first detected. The engagement determination engine 442 then analyzes the user's neurological response to these notifications using the neurological signal sensors 440 to validate the user's intent. This neurological response analysis creates a neurofeedback loop where the engagement determination engine 442 can detect confirmation signals in the brain activity patterns to determine whether to proceed with activating full XR capabilities. In other examples, such a neurofeedback loop may be gradual instead of discrete, where different components of an XR system 408 may be altered progressively, leading to changes in neurological signals, which in turn induce XR capabilities or content alterations, creating a continuous feedback loop.

In operation 462, the XR system 408 responds to the engagement signal 452 by capturing real-world environment data by activating one or more environmental sensors 418 to capture the real-world environment data. For example, when the context determination engine 414 receives the engagement signal 452, the context determination engine 414 activates the environmental sensors 418 to capture real-world environment data 420 containing information about what has captured the attention of the user 406. The environmental sensors 418 can include sensors that collect image data through one or more cameras 454 that capture visual information, one or more audio sensors 472 that capture audio data from the real-world environment 438, one or more pose sensors 432 that track head motion and orientation, one or more GPS sensors, and the like. In some examples, the real world environment data 420 includes tracking data of the user 406. The tracking data can include, but is not limited to, data about the position and location of the hands of the user 406 as captured by the cameras 454 of the environmental sensors 418, a gaze angle or direction of the eyes of the user 406 as captured by the eye tracking sensors 486 of the environmental sensors 418, the location of the user 406 and the pose of the head of the user 406 as captured by the pose sensors 432 of the environmental sensors 418, and the like.

In some examples, the one or more pose sensors 432 include an IMU that tracks the orientation and movements of the user 406. The one or more pose sensors 432 are used to determine SixDegrees of Freedom (6DoF) data of movement of the XR system 408 in three-dimensional space. Specifically, the 6DoF data encompasses three translational movements along the x, y, and z axes (forward/back, up/down, left/right) and three rotational movements (pitch, yaw, roll) included in real-world environment data 420. In the context of XR, 6DoF data allows for the tracking of both position and orientation of an object or user in 3D space.

In some examples, the one or more pose sensors 432 include one or more cameras that capture images of the real-world environment 438. The XR system 408 uses the images and photogrammetric methodologies to determine 6DoF data of the XR system 408.

In some examples, the XR system 408 uses a combination of an IMU and one or more cameras to determine 6DoF for the XR system 408.

In some examples, the context determination engine 414 selectively activates specific sensors of the environmental sensors 418 based on the detected context and user state. This can include cameras for image inputs and object recognition, GPS sensors for location data, audio sensors for sound information, proximity sensors to detect other nearby users, IMU sensors to analyze user movement patterns, and the like.

In operation 464, the context determination engine 414 generates contextual data 430 using the real-world environment data 420. For example, the context determination engine 414 processes the real-world environment data 420 along with external data to generate contextual data 430 including a comprehensive contextual understanding of the real-world environment 438. In some examples, the XR system 408 identifies physical objects in the real-world environment 438 and uses the identified physical objects to generate the contextual data 430. When the context determination engine 414 receives the engagement signal 452, the context determination engine 414 activates the environmental sensors 418 including cameras 454 that capture visual information about the real-world environment 438. The context determination engine 414 processes the real-world environment data 420 through object recognition methodologies to identify physical objects within the real-world environment 438. For example, when a user encounters a T-Rex exhibit in a museum, the context determination engine 414 activates environmental sensors to collect real-world environment data 420 about the exhibit, including using visual recognition methodologies through cameras and location information. The context determination engine 414 processes this multimodal sensor data to generate contextual data 430 that includes a comprehensive understanding of the real-world environment 438 and the identified physical objects.

Figure 8:
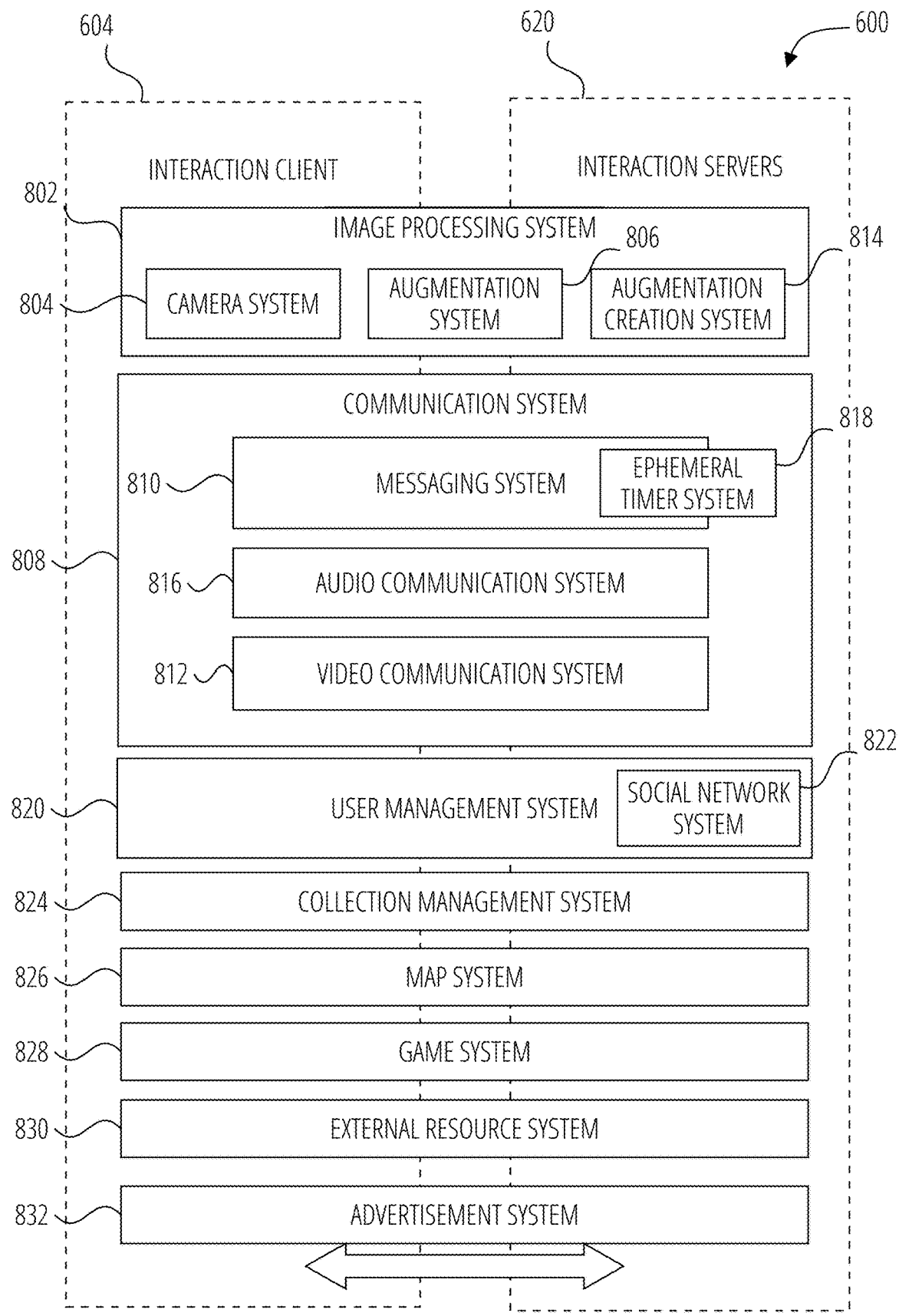
FIG. 8 is a diagrammatic representation of a messaging system that has both client-side and server-side functionality, according to some examples.

In some examples, the context determination engine 414 accesses external resources and systems to generate the contextual data 430. For example, the context determination engine 414 processes external data sources through several integrated components to generate contextual data. An external resource system 830 of FIG. 8 provides an interface for the context determination engine 414 to communicate with remote servers like third-party servers 612 of FIG. 6 to access external applications and resources. The context determination engine 414 can integrate information from social networks, including user preferences, friend connections on an interactive platform, and prior interaction history to determine appropriate content. In some examples, the context determination engine 414 can process this external data along with sensor data through a multimodal large language model that takes in videos, photos, sounds, and text to generate comprehensive contextual understanding.

In additional examples, the context determination engine 414 implements intelligent power management by activating specific sensors useful for a current context. For example, the context determination engine 414 can validate sensor data quality across different positions and implement position-specific signal processing to ensure reliable contextual data collection while maintaining minimal power consumption through selective sensor activation.

In operation 466, the XR system 408 determines, based on the contextual data 430, XR content to be displayed to the user. For example, the context determination engine 414 processes the real-world environment data 420 to generate the contextual data 430 that is communicated to the user interface engine 404. The user interface engine 404 uses the contextual data 430 to determine appropriate XR content to display to the user. The user interface engine 404 analyzes the contextual data 430 along with user preferences, social connections, and prior interaction history to identify relevant XR content and applications that match the user's current engagement and the real-world environment 438.

In some examples, the user interface engine 404 uses an XR user interface control logic 424 and XR user interface object model 422 to determine specific virtual objects 428 of an XR user interface 416 and content to be displayed. In some examples, the user interface engine 404 processes multiple data streams including camera feeds, GPS location, audio input, and proximity to other users to build a comprehensive understanding of what content would be most relevant to the user's current context.

In some examples, the context determination engine 414 processes multimodal inputs including videos, photos, sounds and text through a generative model such as a Large Language Model (LLM) or the like to generate contextually relevant content.

In additional examples, the user interface engine 404 employs machine learning models trained on heterogeneous data to analyze the contextual information and determine appropriate content. In some examples, the user interface engine 404 can process visual data for object recognition, analyze user movement patterns, detect proximity to other users for shared experiences, and combine this with the user's preferences and social connections to select and customize the XR content that will be displayed.

In operation 468, the XR system 408 selectively activates one or more XR capabilities of the XR system 408 to display the determined XR content. For example, the XR system 408 generates an XR user interface 416 provided to the user 406 within an XR environment. The XR user interface 416 includes virtual objects 428 that the user 406 can interact with. For example, a user interface engine 404 of FIG. 4A includes XR user interface control logic 424 comprising a dialog script or the like that specifies a user interface dialog implemented by the XR user interface 416. The XR user interface control logic 424 also comprises one or more actions that are to be taken by the XR system 408 based on detecting various dialog events such as user inputs input by the user 406 using the XR user interface 416 and by making hand gestures. The user interface engine 404 further includes an XR user interface object model 422. The XR user interface object model 422 includes 3D coordinate data of the virtual objects 428. The XR user interface object model 422 also includes 3D graphics data of the virtual objects 428. The 3D graphics data is used by an optical engine 415 to generate the XR user interface 416 for display to the user 406.

The user interface engine 404 generates XR user interface data 410 using the XR user interface object model 422. The XR user interface data 410 includes image data of the virtual objects 428 of the XR user interface 416. The user interface engine 404 communicates the XR user interface data 410 to an image display driver 412 of an optical engine 415 of the XR system 408. The image display driver 412 receives the XR user interface data 410 and generates display control signals using the XR user interface data 410. The image display driver 412 uses the display control signals to control the operations of one or more optical assemblies 402 of the optical engine 415. In response to the display control signals, the one or more optical assemblies 402 generate an XR user interface graphics display 426 of the XR user interface 416 that is provided to the user 406 in the XR user interface 416 provided to the user 406.

In some examples, the XR content can include educational content about objects in the real-world environment such as by providing historical information and interactive 3D models. Virtual objects and graphics can be overlaid on physical objects to provide additional context and information. Navigation aids and wayfinding information can help users explore physical spaces.

In some examples, social content can enable users to share their location and status information with other users, along with media content tied to specific geographic locations.

In some examples, interactive games and entertainment experiences can be provided through the XR user interface.

In some examples, the XR system can display media overlays including pictures, texts, logos, animations, and sound effects that can be applied to photos or video content.

In some examples, location-based content like merchant overlays or live event information can be displayed based on the user's geographic position.

In some examples, visual effects including color overlaying can be applied to enhance the viewing experience.

As an example, the user 406 may go to a museum containing an exhibit like a T-Rex in the real-world environment 438, the XR system 408 detects initial engagement using the neurological signals 448 using the low-power monitoring capabilities. Once engagement is detected by the engagement determination engine 442, the context determination engine 414 activates the environmental sensors 418 to collect contextual data about the T-Rex exhibit that the user is viewing, including visual recognition of the exhibit through cameras and location information. The user interface engine 404 then processes this data along with user preferences and location information to understand the context of the engagement. Based on this analysis, relevant content about the T-Rex exhibit is then displayed through the XR user interface 416, providing an enhanced interactive experience while maintaining power efficiency.

In some examples, an XR system uses a combination of an engagement signal 452 as determined by the user engagement detector 444 and tracking data 476 as a hybrid user input modality. The hybrid user input modality can be used to determine an intent of a user to interact with objects in the real-world environment 438 as well as determine an intent of the user to interact with virtual objects included in an XR user interface 416. For example, the user interface engine 404 can use a combination of eye tracking data and neurological signals 448 signals as a user input modality for the XR user interface 416, where the eye tracking data is used by the user interface engine 404 to determine a targeting of a virtual object of the virtual objects 428 in the XR user interface 416 while the engagement determination engine 442 analyzes the neurological signals 448 provide detection of a an intent of the user to select the targeted virtual object. The user interface engine 404 generates the XR user interface 416 including virtual objects 428 and provides the XR user interface 416 to the user 406. The user interface engine 404 uses a tracking pipeline 474 to generate tracking data 476 including eye tracking data of the user 406. The tracking pipeline 474 uses the environmental sensors 418 to capture real-world environment data 420 used by the tracking pipeline 474 to generate the tracking data 476 including eye tracking data generated from real-world environment data 420 captured by the eye tracking sensors 486 of the eye movements of the user 406. The tracking pipeline 474 provides the eye tracking data as part of tracking data 476 communicated to the user interface engine 404. The user interface engine 404 uses the eye tracking data to determine a targeted virtual object of the virtual objects 428. The engagement determination engine 442 analyzes neurological signals 448 as the user 406 moves their eyes as they look at the virtual objects 428 to determine an intent to interact with a targeted virtual object versus when the user 406 is just exploring the real-world environment 438 or the virtual objects 428 of the XR user interface 416 without a specific intent to interact with a virtual object.

In some examples, the user interface engine 404 builds a 3D model of the real-world environment 438 and the user 406 can select a physical object in the real-world environment 438 using the XR user interface 416. For example, the user interface engine 404 uses a 3D modeling pipeline 480 to capture real-world environment data 420 of the real-world environment 438. The 3D modeling pipeline 480 uses the real-world environment data 420 to generate data of a 3D real-world environment model 484 that is communicated to the user interface engine 404. The user interface engine 404 uses the 3D real-world environment model 484 to identify physical objects in the real-world environment 438 that the user can target using the XR user interface 416. The engagement determination engine 442 analyzes the neurological signals 448 as the user 406 moves their eyes as they look at physical objects in the real-world environment 438 to determine an intent to interact with a targeted physical object versus when the user 406 is just exploring the real-world environment 438 or viewing the virtual objects 428 of the XR user interface 416 without a specific intent to interact with a physical object or a virtual object.

In some examples, hand tracking data included in the tracking data 476 and the engagement signal 452 are to determine a targeted virtual object or physical object as a function of a hybrid input modality. For example, the tracking pipeline 474 uses the real-world environment data 420 to generate hand tracking data of one or more hands of the user 406. The tracking pipeline 474 includes the hand tracking data in the tracking data 476 communicated to the user interface engine 404. The user interface engine 404 uses the hand tracking data to determine that the user 406 is targeting a virtual object of the virtual objects 428 or a physical object in the real-world environment 438. In some examples, the user interface engine 404 uses the hand tracking data to generate a targeting input modality, such as a raycast cursor or the like, that the user 406 can use to target a virtual object in the XR user interface 416 or a physical object in the real-world environment 438.

In some examples, an XR system performs the functions of the context determination engine 414, the user interface engine 404, and the optical engine 415 utilizing various APIs and system libraries.

Figure 5A:
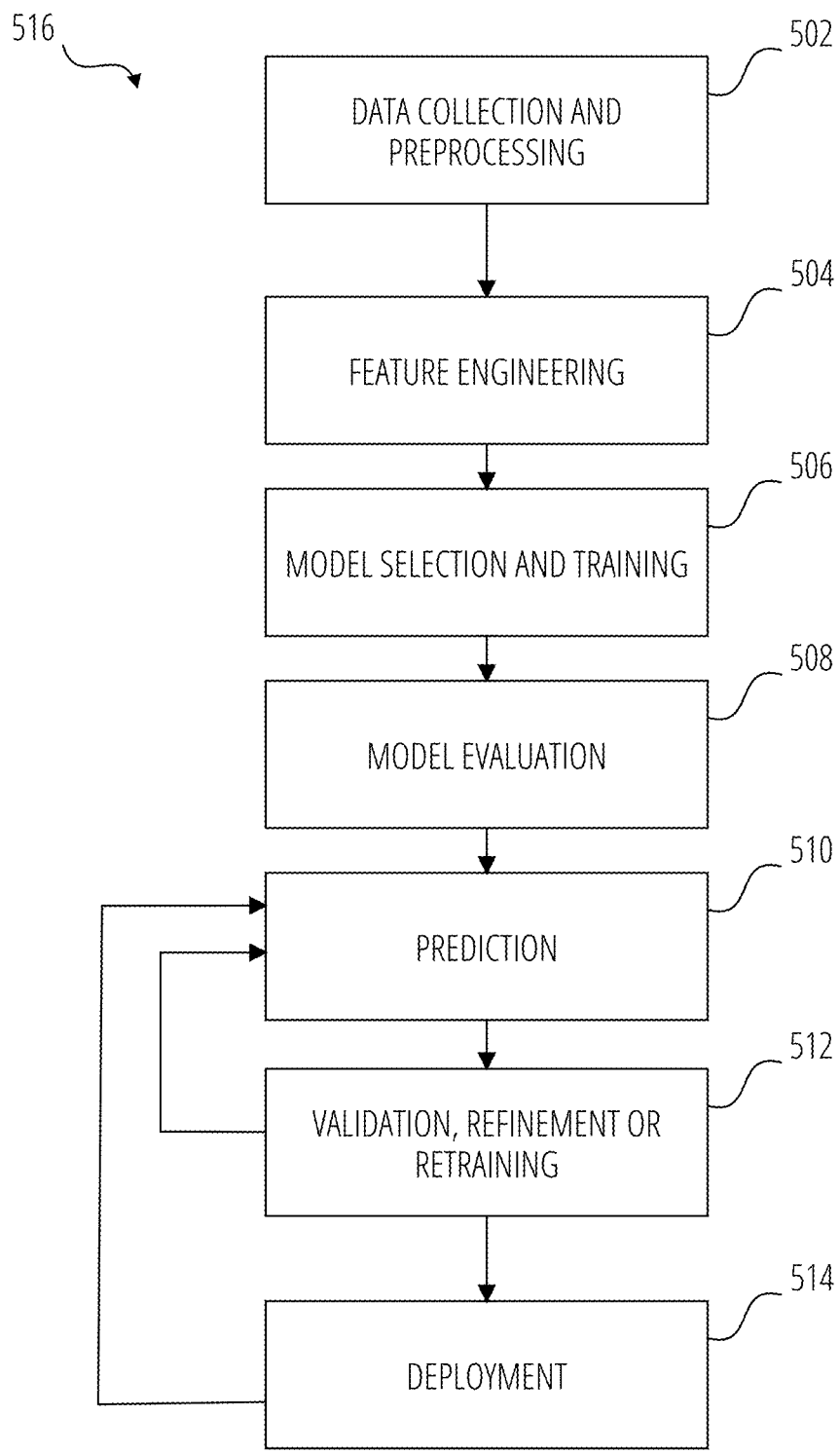
FIG. 5A illustrates a machine-learning pipeline, according to some examples.
Figure 5B:
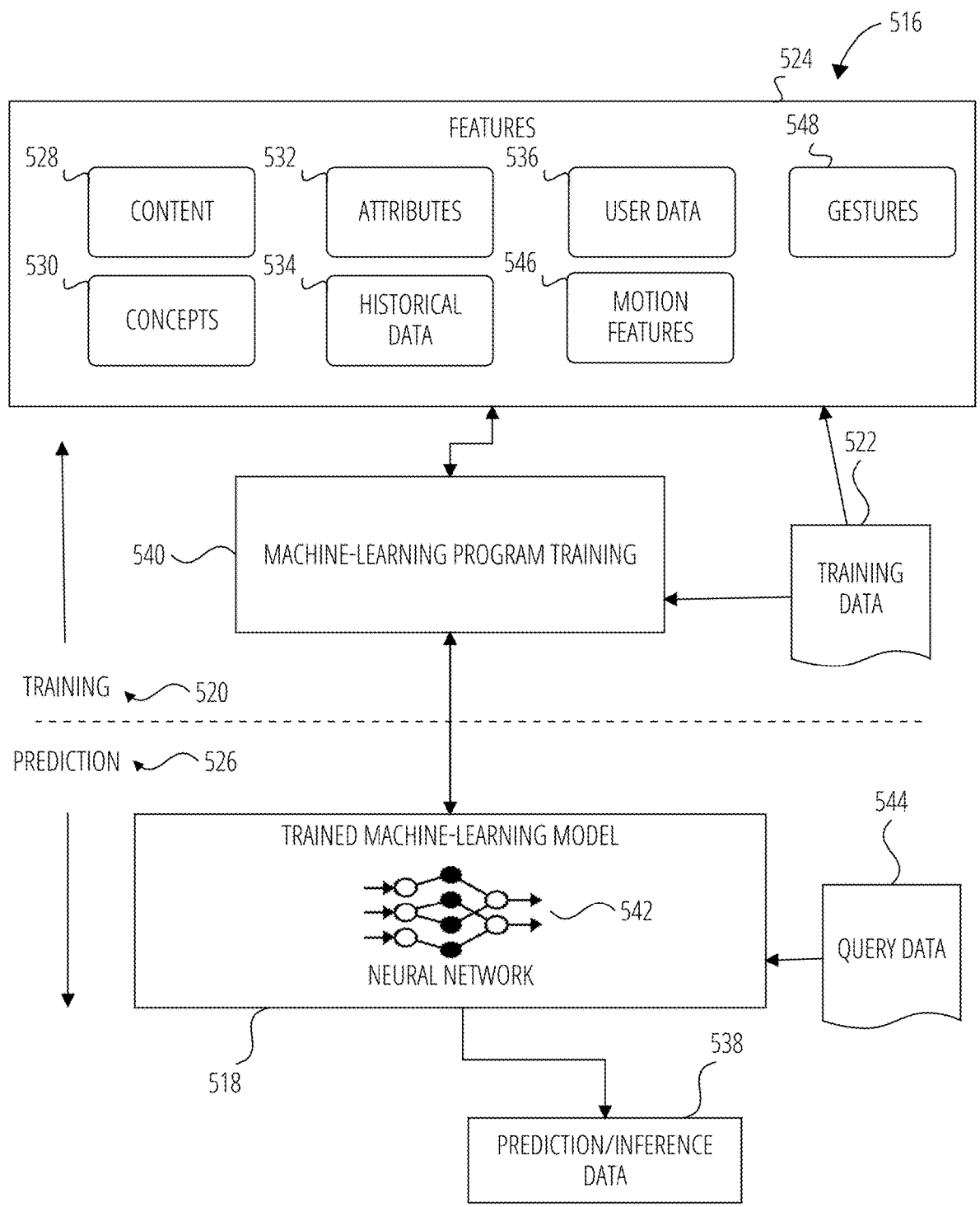
FIG. 5B illustrates training and use of a machine-learning program, according to some examples.

FIG. 5B is a flowchart depicting a machine-learning pipeline 516, according to some examples. The machine-learning pipeline 516 can be used to generate a trained machine-learning model 518, for example an ML model 446 of FIG. 4A or a model used in a neuromorphic system or neuromorphic processor, to detect an engagement of a user with a real-world environment.

Machine learning can involve using computer algorithms to automatically learn patterns and relationships in data, potentially without the need for explicit programming. Machine learning algorithms can be divided into three main categories: supervised learning, unsupervised learning, and reinforcement learning.

Supervised learning involves training a model using labeled data to predict an output for new, unseen inputs. Examples of supervised learning algorithms include linear regression, decision trees, and neural networks.

Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment such by receiving feedback in the form of rewards or penalties. Examples of reinforcement learning algorithms include Q-learning and policy gradient methods.

Examples of specific machine learning algorithms that can be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks, which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models may be evaluated on a separate test set of data that was not used during training to ensure that the model can generalize to new, unseen data.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting can be used in various machine learning applications.

Three example types of problems in machine learning are classification problems, regression problems, and generation problems. Classification problems, also referred to as categorization problems, aim at classifying items into one of several category values (for example, is this object an apple or an orange?). Regression algorithms aim at quantifying some items (for example, by providing a value that is a real number). Generation algorithms aim at producing new examples that are similar to examples provided for training. For instance, a text generation algorithm is trained on many text documents and is configured to generate new coherent text with similar statistical properties as the training data.

Generating a trained machine-learning model 518 can include multiple phases that form part of the machine-learning pipeline 516, including for example the following phases illustrated in FIG. 5A:

Data collection and preprocessing 502: This phase can include acquiring and cleaning data to ensure that it is suitable for use in the machine learning model. This phase can also include removing duplicates, handling missing values, and converting data into a suitable format.

Feature engineering 504: This phase can include selecting and transforming the training data 522 to create features that are useful for predicting the target variable. Feature engineering can include (1) receiving features 524 (e.g., as structured or labeled data in supervised learning) and/or (2) identifying features 524 (e.g., unstructured or unlabeled data for unsupervised learning) in training data 522.

Model selection and training 506: This phase can include selecting an appropriate machine learning algorithm and training it on the preprocessed data. This phase can further involve splitting the data into training and testing sets, using cross-validation to evaluate the model, and tuning hyperparameters to improve performance.

Model evaluation 508: This phase can include evaluating the performance of a trained model (e.g., the trained machine-learning model 518) on a separate testing dataset. This phase can help determine if the model is overfitting or underfitting and determine whether the model is suitable for deployment.

Prediction 510: This phase involves using a trained model (e.g., trained machine-learning model 518) to generate predictions on new, unseen data.

Validation, refinement or retraining 512: This phase can include updating a model based on feedback generated from the prediction phase, such as new data or user feedback.

Deployment 514: This phase can include integrating the trained model (e.g., the trained machine-learning model 518) into a more extensive system or application, such as a web service, mobile app, or IoT device. This phase can involve setting up APIs, building a user interface, and ensuring that the model is scalable and can handle large volumes of data.

FIG. 5B illustrates further details of two example phases, namely a training phase 520 (e.g., part of the model selection and trainings 506) and a prediction phase 526 (part of prediction 510). Prior to the training phase 520, feature engineering 504 is used to identify features 524. This can include identifying informative, discriminating, and independent features for effectively operating the trained machine-learning model 518 in pattern recognition, classification, and regression. In some examples, the training data 522 includes labeled data, known for pre-identified features 524 and one or more outcomes. Each of the features 524 can be a variable or attribute, such as an individual measurable property of a process, article, system, or phenomenon represented by a data set (e.g., the training data 522). Features 524 can also be of different types, such as numeric features, strings, and graphs, and can include one or more of content 528, concepts 530, attributes 532, historical data 534, user data 536, motion features 546, and/or gestures 548 merely for example.

In training phase 520, the machine-learning pipeline 516 uses the training data 522 to find correlations among the features 524 that affect a predicted outcome or prediction/inference data 538.

In some examples, the training data 522 includes tracking image data captured of various hand gestures labeled with the type of hand gesture such as, but not limited to, pinch gestures.

With the training data 522 and the identified features 524, the trained machine-learning model 518 is trained during the training phase 520 during machine-learning program training 540. The machine-learning program training 540 appraises values of the features 524 as they correlate to the training data 522. The result of the training is the trained machine-learning model 518 (e.g., a trained or learned model).

Further, the training phase 520 can involve machine learning, in which the training data 522 is structured (e.g., labeled during preprocessing operations). The trained machine-learning model 518 implements a neural network 542 capable of performing, for example, classification and clustering operations. In other examples, the training phase 520 can involve deep learning, in which the training data 522 is unstructured, and the trained machine-learning model 518 implements a deep neural network 542 that can perform both feature extraction and classification/clustering operations.

In some examples, a neural network 542 can be generated during the training phase 520, and implemented within the trained machine-learning model 518. The neural network 542 includes a hierarchical (e.g., layered) organization of neurons, with each layer consisting of multiple neurons or nodes. Neurons in the input layer receive the input data, while neurons in the output layer produce the final output of the network. Between the input and output layers, there can be one or more hidden layers, each consisting of multiple neurons.

Each neuron in the neural network 542 operationally computes a function, such as an activation function, which takes as input the weighted sum of the outputs of the neurons in the previous layer, as well as a bias term. The output of this function is then passed as input to the neurons in the next layer. If the output of the activation function exceeds a specified threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks can use different activation functions and learning algorithms, affecting their performance on different tasks. The layered organization of neurons and the use of activation functions and weights enable neural networks to model complex relationships between inputs and outputs, and to generalize to new inputs that were not seen during training.

In some examples, the neural network 542 can also be one of several different types of neural networks, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In some examples, the trained machine-learning model 518 is a component of a neuromorphic computation system. Neuromorphic computation systems employ specialized machine learning models that align with their brain-inspired architecture such as, but not limited to:

Spiking Neural Networks (SNNs): SNNs process binary events or "spikes," making them computationally efficient and suitable for temporal and spatial data processing.

Leaky Integrate-and-Fire (LIF) Model: This neuron model simulates the basic properties of biological neurons, including charge accumulation and threshold-based firing.

Izhikevich Model: A neuron model that offers a good balance between biological plausibility and computational efficiency.

In addition to the training phase 520, a validation phase can be performed on a separate dataset known as the validation dataset. The validation dataset is used to tune the hyperparameters of a model, such as the learning rate and the regularization parameter. The hyperparameters are adjusted to improve the model's performance on the validation dataset.

Once a model is fully trained and validated, in a testing phase, the trained machine-learning model 518 can be tested on a new dataset. The testing dataset is used to evaluate the performance of the trained machine-learning model 518 and ensure that the trained machine-learning model 518 has not overfitted the training data.

In prediction phase 526, the trained machine-learning model 518 uses the features 524 for analyzing query data 544 to generate inferences, outcomes, or predictions, as examples of a prediction/inference data 538. For example, during prediction phase 526, the trained machine-learning model 518 generates an output. Query data 544 is provided as an input to the trained machine-learning model 518, and the trained machine-learning model 518 generates the prediction/inference data 538 as output, responsive to receipt of the query data 544.

In some examples, a logistic regression model is employed within the XR system to facilitate predictions of user intent. Such a model is adept at predicting a probability that a given target variable falls into one of two distinct categories. Within the XR environment, these categories could represent the user's action or inaction regarding the selection of a virtual object or a physical object. The logistic regression model functions by directly processing the input features—such as motion dynamics data including velocity, acceleration, and angular displacement—to calculate the likelihood of an event, such as the user's intent to select an object. Unlike more complex machine learning models that utilize hidden layers to uncover latent features within the data, logistic regression does not compute such hidden features. Instead, it applies a logistic function to the input features to produce an output value ranging between 0 and 1, which corresponds to the probability of the event. This output can then be thresholded to make a binary decision. For instance, if the probability is greater than 0.5, the event might be classified as a 'selection' of a virtual object by the user; otherwise, it might be classified as 'non-selection.' The simplicity of logistic regression, with its direct approach to feature processing and absence of hidden layers, offers computational efficiency and ease of interpretation. This makes logistic regression a suitable choice for applications where the relationship between the input features and the target variable is approximately linear or when a more interpretable model is desirable.

In some examples, training data 522 for a trained machine-learning model 518 of a neuromorphic computation system can include endogenous brain signal data such as alpha wave patterns collected during eyes open versus eyes closed states, brain activity patterns associated with intentional versus casual eye movements, and neural responses to notification sounds or visual feedback. In some examples, contextual training data can include visual recognition data from cameras for object identification, eye tracking data combined with brain response patterns, head motion and orientation data from IMU sensors, location data from GPS sensors 470, audio input data, and proximity data to other users. In some examples, the training data 522 also incorporates user response patterns, including brain responses to notifications, neural feedback signals indicating confirmation of intent, and engagement patterns when multiple users focus on the same content.

In some examples, a trained machine-learning model 518 can be re-trained for personalization purposes. For example, the training data 522 can include user preferences, social connections, prior interaction history, and individual user brain wave patterns to account for inter-individual variability.

In some examples, the trained machine-learning model 518 is a component of a neuromorphic computation system and specialized training processes are used such as, but not limited to:

Spike-Timing-Dependent Plasticity (STDP): This learning rule modifies the strength of connections based on the relative timing of neuron activations, enabling self-learning and adaptability.

SpikeProp: An adaptation of the backpropagation algorithm for training SNNs, designed to work with spike-based information rather than continuous signals Neuromodulation Techniques: These algorithms alter network dynamics to improve learning efficiency and adaptability Differential Evolution (DE), Grammatical Evolution (GE), and Harmony Search Algorithm (HSA): These evolutionary algorithms can be used to optimize neuromorphic systems.

In some examples, the trained machine-learning model 518 is trained using leave-one-user-out cross-validation. In this training approach, the trained machine-learning model 518 is repeatedly trained on the dataset of all users except one, which is held back and used for validation. This process is iterated such that each user's data is used as the validation set exactly once. The result is a machine learning model that is not only fine-tuned to the intricacies of individual user behavior but also possesses a degree of generalizability, making it capable of predicting targeting intent for users it has not encountered before.

In some examples, passive BCI methodologies are used where an XR system silently adapts to users' mental states in the background without requiring explicit control actions. The XR system uses this passive BCI approach to precisely adapt and conform to the user's mental states in the background, not for direct control but to enable the XR system to adapt to detected mental states. This is different from active BCI systems that require explicit user control actions. The implementation involves analyzing brain responses to subtle cues like notification sounds and using that neural feedback to adjust the XR system's behavior automatically.

These training methodologies enhance the XR system's ability to adapt to new users, ensuring that the XR system remains intuitive and responsive regardless of variations in individual user behavior.

Figure 6:
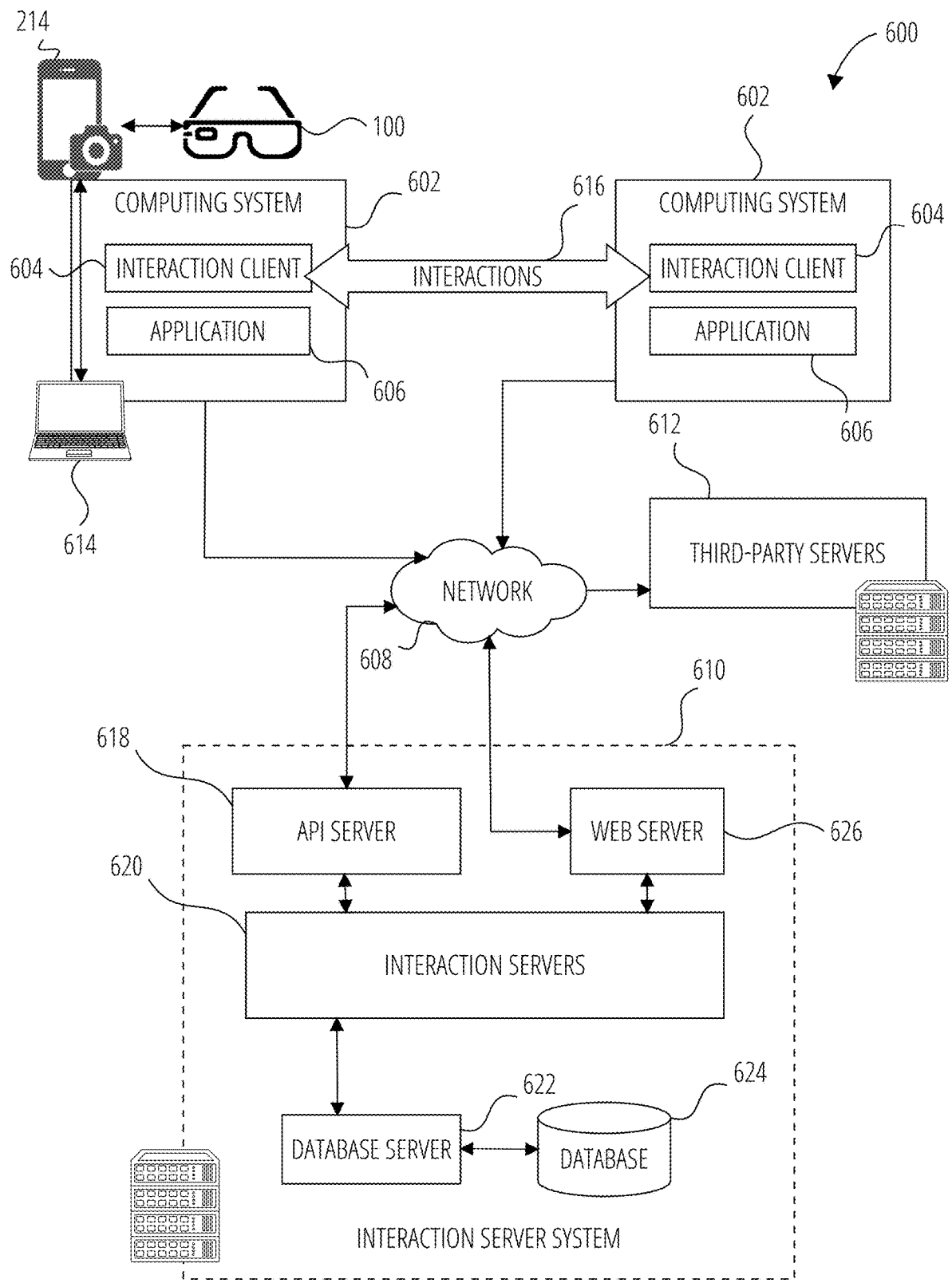
FIG. 6 is a diagrammatic representation of a networked environment in which the examples of the present disclosure can be deployed, according to some examples.

FIG. 6 is a block diagram showing an example interaction system 600 for facilitating interactions (e.g., exchanging text messages, conducting text audio and video calls, or playing games) over a network. The interaction system 600 includes multiple XR systems 602, each of which hosts multiple applications, including an interaction client 604 and other applications 606. Each interaction client 604 is communicatively coupled, via one or more communication networks including a network 608 (e.g., the Internet), to other instances of the interaction client 604 (e.g., hosted on respective other XR systems 602), an interaction server system 610 and third-party servers 612). An interaction client 604 can also communicate with locally hosted applications 606 using Applications Program Interfaces (APIs).

Each computing system 602 can comprise one or more user devices, such as a mobile device 214, head-wearable apparatus 100, and a computer client device 614 that are communicatively connected to exchange data and messages.

An interaction client 604 interacts with other interaction clients 604 and with the interaction server system 610 via the network 608. The data exchanged between the interaction clients 604 (e.g., interactions 616) and between the interaction clients 604 and the interaction server system 610 includes functions (e.g., commands to invoke functions) and payload data (e.g., text, audio, video, or other multimedia data).

The interaction server system 610 provides server-side functionality via the network 608 to the interaction clients 604. While some functions of the interaction system 600 are described herein as being performed by either an interaction client 604 or by the interaction server system 610, the location of some functionality either within the interaction client 604 or the interaction server system 610 can be a design choice. For example, it can be technically preferable to initially deploy particular technology and functionality within the interaction server system 610 but to later migrate this technology and functionality to the interaction client 604 where a computing system 602 has sufficient processing capacity.

The interaction server system 610 supports various services and operations that are provided to the interaction clients 604. Such operations include transmitting data to, receiving data from, and processing data generated by the interaction clients 604. This data can include message content, client device information, geolocation information, media augmentation and overlays, message content persistence conditions, social network information, and live event information. Data exchanges within the interaction system 600 are invoked and controlled through functions available via user interfaces (UIs) of the interaction clients 604.

Turning now specifically to the interaction server system 610, an Application Program Interface (API) server 618 is coupled to and provides programmatic interfaces to Interaction servers 620, making the functions of the Interaction servers 620 accessible to interaction clients 604, other applications 606 and third-party server 612. The interaction servers 620 are communicatively coupled to a database server 622, facilitating access to a database 624 that stores data associated with interactions processed by the Interaction servers 620. Similarly, a web server 626 is coupled to the interaction servers 620 and provides web-based interfaces to the Interaction servers 620. To this end, the web server 626 processes incoming network requests over the Hypertext Transfer Protocol (HTTP) and several other related protocols.

The Application Program Interface (API) server 618 receives and transmits interaction data (e.g., commands and message payloads) between the interaction servers 620 and the XR systems 602 (and, for example, interaction clients 604 and other application 606) and the third-party server 612. Specifically, the Application Program Interface (API) server 618 provides a set of interfaces (e.g., routines and protocols) that can be called or queried by the interaction client 604 and other applications 606 to invoke functionality of the Interaction servers 620. The Application Program Interface (API) server 618 exposes various functions supported by the Interaction servers 620, including account registration; login functionality; the sending of interaction data, via the Interaction servers 620, from a particular interaction client 604 to another interaction client 604; the communication of media files (e.g., images or video) from an interaction client 604 to the interaction servers 620; the settings of a collection of media data (e.g., a story); the retrieval of a list of friends of a user of a computing system 602; the retrieval of messages and content; the addition and deletion of entities (e.g., friends) to an entity graph (e.g., a social graph); the location of friends within a social graph; and opening an application event (e.g., relating to the interaction client 604).

The interaction servers 620 host multiple systems and subsystems, described below with reference to FIG. 8.

Returning to the interaction client 604, features and functions of an external resource (e.g., a linked application 606 or applet) are made available to a user via an interface of the interaction client 604. In this context, "external" refers to the fact that the application 606 or applet is external to the interaction client 604. The external resource is often provided by a third party but can also be provided by the creator or provider of the interaction client 604. The interaction client 604 receives a user selection of an option to launch or access features of such an external resource. The external resource can be the application 606 installed on the computing system 602 (e.g., a "native app"), or a small-scale version of the application (e.g., an "applet") that is hosted on the computing system 602 or remote of the computing system 602 (e.g., on third-party servers 612). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 604. In addition to using markup-language documents (e.g., a.*ml file), an applet can incorporate a scripting language (e.g., a.*js file or a.json file) and a style sheet (e.g., a.*ss file).

In response to receiving a user selection of the option to launch or access features of the external resource, the interaction client 604 determines whether the selected external resource is a web-based external resource or a locally-installed application 606. In some cases, applications 606 that are locally installed on the computing system 602 can be launched independently of and separately from the interaction client 604, such as by selecting an icon corresponding to the application 606 on a home screen of the computing system 602. Small-scale versions of such applications can be launched or accessed via the interaction client 604 and, in some examples, no or limited portions of the small-scale application can be accessed outside of the interaction client 604. The small-scale application can be launched by the interaction client 604 receiving, from a third-party server 612 for example, a markup-language document associated with the small-scale application and processing such a document.

In response to determining that the external resource is a locally-installed application 606, the interaction client 604 instructs the computing system 602 to launch the external resource by executing locally-stored code corresponding to the external resource. In response to determining that the external resource is a web-based resource, the interaction client 604 communicates with the third-party servers 612 (for example) to obtain a markup-language document corresponding to the selected external resource. The interaction client 604 then processes the obtained markup-language document to present the web-based external resource within a user interface of the interaction client 604.

The interaction client 604 can notify a user of the computing system 602, or other users related to such a user (e.g., "friends"), of activity taking place in one or more external resources. For example, the interaction client 604 can provide participants in a conversation (e.g., a chat session) in the interaction client 604 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 604, with the ability to share an item, status, state, or location in an external resource in a chat session with one or more members of a group of users. The shared item can be an interactive chat card with which members of the chat can interact, for example, to launch the corresponding external resource, view specific information within the external resource, or take the member of the chat to a specific location or state within the external resource. Within a given external resource, response messages can be sent to users on the interaction client 604. The external resource can selectively include different media items in the responses, based on a current context of the external resource.

The interaction client 604 can present a list of the available external resources (e.g., applications 606 or applets) to a user to launch or access a given external resource. This list can be presented in a context-sensitive menu. For example, the icons representing different ones of the application 606 (or applets) can vary based on how the menu is launched by the user (e.g., from a conversation interface or from a non-conversation interface).

Figure 7:
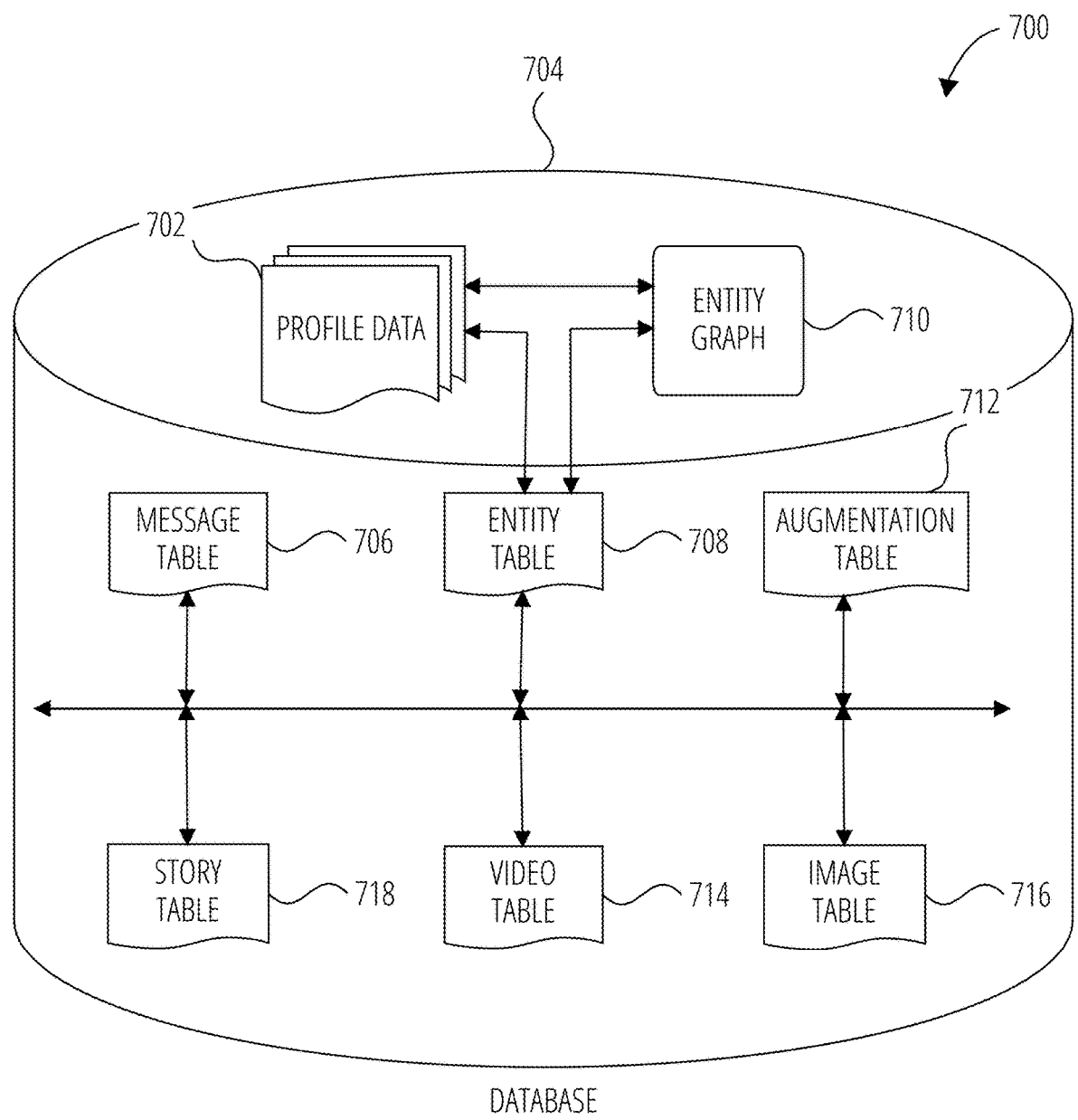
FIG. 7 is a diagrammatic representation of a data structure as maintained in a database, according to some examples.

FIG. 7 is a schematic diagram illustrating data structures 700, which can be stored in the database 704 of the interaction server system 610, according to some examples. While the content of the database 704 is shown to comprise multiple tables, it will be appreciated that the data could be stored in other types of data structures (e.g., as an object-oriented database).

The database 704 includes message data stored within a message table 706. This message data includes, for any particular message, at least message sender data, message recipient (or receiver) data, and a payload. Further details regarding information that can be included in a message, and included within the message data stored in the message table 706, are described below with reference to FIG. 7.

An entity table 708 stores entity data, and is linked (e.g., referentially) to an entity graph 710 and profile data 702. Entities for which records are maintained within the entity table 708 can include individuals, corporate entities, organizations, objects, places, events, and so forth. Regardless of entity type, any entity regarding which the interaction server system 610 stores data can be a recognized entity. Each entity is provided with a unique identifier, as well as an entity type identifier (not shown).

The entity graph 710 stores information regarding relationships and associations between entities. Such relationships can be social, professional (e.g., work at a common corporation or organization), interest-based, or activity-based, merely for example. Some relationships between entities can be unidirectional, such as a subscription by an individual user to digital content of a commercial or publishing user (e.g., a newspaper or other digital media outlet, or a brand). Other relationships can be bidirectional, such as a "friend" relationship between individual users of the interaction system 600.

some permissions and relationships can be attached to each relationship, and also to each direction of a relationship. For example, a bidirectional relationship (e.g., a friend relationship between individual users) can include authorization for the publication of digital content items between the individual users, but can impose some restrictions or filters on the publication of such digital content items (e.g., based on content characteristics, location data or time of day data). Similarly, a subscription relationship between an individual user and a commercial user can impose different degrees of restrictions on the publication of digital content from the commercial user to the individual user, and can significantly restrict or block the publication of digital content from the individual user to the commercial user. A particular user, as an example of an entity, can record some restrictions (e.g., by way of privacy settings) in a record for that entity within the entity table 708. Such privacy settings can be applied to all types of relationships within the context of the interaction system 600, or can selectively be applied to only some types of relationships.

The profile data 702 stores multiple types of profile data about a particular entity. The profile data 702 can be selectively used and presented to other users of the interaction system 600 based on privacy settings specified by a particular entity. Where the entity is an individual, the profile data 702 includes, for example, a username, telephone number, address, settings (e.g., notification and privacy settings), as well as a user-selected avatar representation (or collection of such avatar representations). A particular user can then selectively include one or more of these avatar representations within the content of messages communicated via the interaction system 600, and on map interfaces displayed by interaction clients 604 to other users. The collection of avatar representations can include "status avatars," which present a graphical representation of a status or activity that the user can select to communicate at a particular time.

Where the entity is a group, the profile data 702 for the group can similarly include one or more avatar representations associated with the group, in addition to the group name, members, and various settings (e.g., notifications) for the relevant group.

The database 704 also stores augmentation data, such as overlays or filters, in an augmentation table 712. The augmentation data is associated with and applied to videos (for which data is stored in a video table 714) and images (for which data is stored in an image table 716).

Filters, in some examples, are overlays that are displayed as overlaid on an image or video during presentation to a message receiver. Filters can be of various types, including user-selected filters from a set of filters presented to a message sender by the interaction client 604 when the message sender is composing a message. Other types of filters include geolocation filters (also known as geo-filters), which can be presented to a message sender based on geographic location. For example, geolocation filters specific to a neighborhood or special location can be presented within a user interface by the interaction client 604, based on geolocation information determined by a GPS unit of the computing system 602.

Another type of filter is a data filter, which can be selectively presented to a message sender by the interaction client 604 based on other inputs or information gathered by the computing system 602 during the message creation process. Examples of data filters include current temperature at a specific location, a current speed at which a message sender is traveling, battery life for a computing system 602, or the current time.

Other augmentation data that can be stored within the image table 716 includes XR content items (e.g., corresponding to applying XR experiences). An XR content item can be a real-time special effect and sound that can be added to an image or a video.

As described above, XR content items include overlays, image transformations, images, and modifications that can be applied to image data (e.g., videos or images). This includes real-time modifications, which modify an image as it is captured using device sensors (e.g., one or multiple cameras) of the computing system 602 and then displayed on a screen of the computing system 602 with the modifications. This also includes modifications to stored content, such as video clips in a collection or group that can be modified. For example, in a computing system 602 with access to multiple XR content items, a user can use a single video clip with multiple XR content items to see how the different XR content items will modify the stored clip. Similarly, real-time video capture can use modifications to show how video images currently being captured by sensors of a computing system 602 would modify the captured data. Such data can simply be displayed on the screen and not stored in memory, or the content captured by the device sensors can be recorded and stored in memory with or without the modifications (or both). In some systems, a preview feature can show how different XR content items will look within different windows in a display at the same time. This can, for example, enable multiple windows with different pseudorandom animations to be viewed on a display at the same time.

Data and various systems using XR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations can be used. Some examples can involve generating a three-dimensional mesh model of the object or objects, and using transformations and animated textures of the model within the video to achieve the transformation. In some examples, tracking of points on an object can be used to place an image or texture (which can be two-dimensional or three-dimensional) at the tracked position. In still further examples, neural network analysis of video frames can be used to place images, models, or textures in content (e.g., images or frames of video). XR content items thus refer both to the images, models, and textures used to create transformations in content, as well as to additional modeling and analysis information used to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications can involve changing the color of areas; removing some part of areas from the frames of the video stream; including new objects into areas that are based on a request for modification; and modifying or distorting the elements of an area or object. In various examples, any combination of such modifications or other similar modifications can be used. For some models to be animated, some characteristic points can be selected as control points to be used in determining the entire state-space of options for the model animation.

In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, visual features are located using a landmark, which represents a distinguishable point present in a portion of the images under consideration. For facial landmarks, for example, the location of the left eye pupil can be used. If an initial landmark is not identifiable (e.g., if a person has an eyepatch), secondary landmarks can be used. Such landmark identification procedures can be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

A transformation system can capture an image or video stream on a client device (e.g., the computing system 602) and perform complex image manipulations locally on the computing system 602 while maintaining a suitable user experience, computation time, and power consumption. The complex image manipulations can include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the computing system 602.

In some examples, a computer animation model to transform image data can be used by a system where a user can capture an image or video stream of the user (e.g., a selfie) using the computing system 602 having a neural network operating as part of an interaction client 604 operating on the computing system 602. The transformation system operating within the interaction client 604 determines the presence of a face within the image or video stream and provides modification icons associated with a computer animation model to transform image data, or the computer animation model can be present as associated with an interface described herein. The modification icons include changes that are the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream can be presented in a graphical user interface displayed on the computing system 602 as soon as the image or video stream is captured and a specified modification is selected. The transformation system can implement a complex convolutional neural network on a portion of the image or video stream to generate and apply the selected modification. That is, the user can capture the image or video stream and be presented with a modified result in real-time or near real-time once a modification icon has been selected. Further, the modification can be persistent while the video stream is being captured, and the selected modification icon remains toggled. Machine-taught neural networks can be used to enable such modifications.

The graphical user interface, presenting the modification performed by the transform system, can supply the user with additional interaction options. Such options can be based on the interface used to initiate the content capture and selection of a particular computer animation model (e.g., initiation from a content creator user interface). In various examples, a modification can be persistent after an initial selection of a modification icon. The user can toggle the modification on or off by tapping or otherwise selecting the face being modified by the transformation system and store it for later viewing or browsing to other areas of the imaging application. Where multiple faces are modified by the transformation system, the user can toggle the modification on or off globally by tapping or selecting a single face modified and displayed within a graphical user interface. In some examples, individual faces, among a group of multiple faces, can be individually modified, or such modifications can be individually toggled by tapping or selecting the individual face or a series of individual faces displayed within the graphical user interface.

A story table 718 stores data regarding collections of messages and associated image, video, or audio data, which are compiled into a collection (e.g., a story or a gallery). The creation of a particular collection can be initiated by a particular user (e.g., each user for which a record is maintained in the entity table 708). A user can create a "personal story" in the form of a collection of content that has been created and sent/broadcast by that user. To this end, the user interface of the interaction client 604 can include an icon that is user-selectable to enable a message sender to add specific content to his or her personal story.

A collection can also constitute a "live story," which is a collection of content from multiple users that is created manually, automatically, or using a combination of manual and automatic techniques. For example, a "live story" can constitute a curated stream of user-submitted content from various locations and events. Users whose client devices have location services enabled and are at a common location event at a particular time can, for example, be presented with an option, via a user interface of the interaction client 604, to contribute content to a particular live story. The live story can be identified to the user by the interaction client 604, based on his or her location. The end result is a "live story" told from a community perspective.

A further type of content collection is known as a "location story," which enables a user whose computing system 602 is located within a specific geographic location (e.g., on a college or university campus) to contribute to a particular collection. In some examples, a contribution to a location story can require a second degree of authentication to verify that the end-user belongs to a specific organization or other entity (e.g., is a student on the university campus).

As mentioned above, the video table 714 stores video data that, in some examples, is associated with messages for which records are maintained within the message table 706. Similarly, the image table 716 stores image data associated with messages for which message data is stored in the entity table 708. The entity table 708 can associate various augmentations from the augmentation table 712 with various images and videos stored in the image table 716 and the video table 714.

The databases 704 also includes social network information collected by the social network system 822.

FIG. 8 is a block diagram illustrating further details regarding the interaction system 600, according to some examples. Specifically, the interaction system 600 is shown to comprise the interaction client 604 and the Interaction servers 620. The interaction system 600 embodies multiple subsystems, which are supported on the client-side by the interaction client 604 and on the server-side by the Interaction servers 620. Example subsystems are discussed below.

An image processing system 802 provides various functions that enable a user to capture and augment (e.g., augment or otherwise modify or edit) media content associated with a message.

A camera system 804 includes control software (e.g., in a camera application) that interacts with and controls hardware camera hardware (e.g., directly or via operating system controls) of the computing system 602 to modify and augment real-time images captured and displayed via the interaction client 604.

The augmentation system 806 provides functions related to the generation and publishing of augmentations (e.g., media overlays) for images captured in real-time by cameras of the computing system 602 or retrieved from memory of the computing system 602. For example, the augmentation system 806 operatively selects, presents, and displays media overlays (e.g., an image filter or an image lens) to the interaction client 604 for the augmentation of real-time images received via the camera system 804 or stored images retrieved from memory 202 of a computing system 602. These augmentations are selected by the augmentation system 806 and presented to a user of an interaction client 604, based on a number of inputs and data, such as for example:

Geolocation of the computing system 602; and

Social network information of the user of the computing system 602.

An augmentation can include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at computing system 602 for communication in a message, or applied to video content, such as a video content stream or feed transmitted from an interaction client 604. As such, the image processing system 802 can interact with, and support, the various subsystems of the communication system 808, such as the messaging system 810 and the video communication system 812.

A media overlay can include text or image data that can be overlaid on top of a photograph taken by the computing system 602 or a video stream produced by the computing system 602. In some examples, the media overlay can be a location overlay (e.g., Venice beach), a name of a live event, or a name of a merchant overlay (e.g., Beach Coffee House). In further examples, the image processing system 802 uses the geolocation of the computing system 602 to identify a media overlay that includes the name of a merchant at the geolocation of the computing system 602. The media overlay can include other indicia associated with the merchant. The media overlays can be stored in the databases 624 and accessed through the database server 622.

The image processing system 802 provides a user-based publication platform that enables users to select a geolocation on a map and upload content associated with the selected geolocation. The user can also specify circumstances under which a particular media overlay should be offered to other users. The image processing system 802 generates a media overlay that includes the uploaded content and associates the uploaded content with the selected geolocation.

The augmentation creation system 814 supports XR developer platforms and includes an application for content creators (e.g., artists and developers) to create and publish augmentations (e.g., XR experiences) of the interaction client 604. The augmentation creation system 814 provides a library of built-in features and tools to content creators including, for example custom shaders, tracking technology, and templates.

In some examples, the augmentation creation system 814 provides a merchant-based publication platform that enables merchants to select a particular augmentation associated with a geolocation via a bidding process. For example, the augmentation creation system 814 associates a media overlay of the highest bidding merchant with a corresponding geolocation for a predefined amount of time.

A communication system 808 is responsible for enabling and processing multiple forms of communication and interaction within the interaction system 600 and includes a messaging system 810, an audio communication system 816, and a video communication system 812. The messaging system 810 is responsible for enforcing the temporary or time-limited access to content by the interaction clients 604. The messaging system 810 incorporates multiple timers (e.g., within an ephemeral timer system 818) that, based on duration and display parameters associated with a message or collection of messages (e.g., a story), selectively enable access (e.g., for presentation and display) to messages and associated content via the interaction client 604. Further details regarding the operation of the ephemeral timer system 818 are provided below. The audio communication system 816 enables and supports audio communications (e.g., real-time audio chat) between multiple interaction clients 604. Similarly, the video communication system 812 enables and supports video communications (e.g., real-time video chat) between multiple interaction clients 604.

A user management system 820 is operationally responsible for the management of user data and profiles, and includes a social network system 822 that maintains social network information regarding relationships between users of the interaction system 600.

A collection management system 824 is operationally responsible for managing sets or collections of media (e.g., collections of text, image video, and audio data). A collection of content (e.g., messages, including images, video, text, and audio) can be organized into an "event gallery" or an "event story." Such a collection can be made available for a specified time period, such as the duration of an event to which the content relates. For example, content relating to a music concert can be made available as a "story" for the duration of that music concert. The collection management system 824 can also be responsible for publishing an icon that provides notification of a particular collection to the user interface of the interaction client 604. The collection management system 824 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 824 employs machine vision (or image recognition technology) and content rules to curate a content collection automatically. In some examples, compensation can be paid to a user to include user-generated content into a collection. In such cases, the collection management system 824 operates to automatically make payments to such users to use their content.

A map system 826 provides various geographic location functions and supports the presentation of map-based media content and messages by the interaction client 604. For example, the map system 826 enables the display of user icons or avatars (e.g., stored in profile data 702) on a map to indicate a current or past location of "friends" of a user, as well as media content (e.g., collections of messages including photographs and videos) generated by such friends, within the context of a map. For example, a message posted by a user to the interaction system 600 from a specific geographic location can be displayed within the context of a map at that particular location to "friends" of a specific user on a map interface of the interaction client 604. A user can furthermore share his or her location and status information (e.g., using an appropriate status avatar) with other users of the interaction system 600 via the interaction client 604, with this location and status information being similarly displayed within the context of a map interface of the interaction client 604 to selected users.

A game system 828 provides various gaming functions within the context of the interaction client 604. The interaction client 604 provides a game interface providing a list of available games that can be launched by a user within the context of the interaction client 604 and played with other users of the interaction system 600. The interaction system 600 further enables a particular user to invite other users to participate in the play of a specific game by issuing invitations to such other users from the interaction client 604. The interaction client 604 also supports audio, video, and text messaging (e.g., chats) within the context of gameplay, provides a leaderboard for the games, and also supports the provision of in-game rewards (e.g., coins and items).

An external resource system 830 provides an interface for the interaction client 604 to communicate with remote servers (e.g., third-party servers 612) to launch or access external resources, i.e., applications or applets. Each third-party server 612 hosts, for example, a markup language (e.g., HTML5) based application or a small-scale version of an application (e.g., game, utility, payment, or ride-sharing application). The interaction client 604 can launch a web-based resource (e.g., application) by accessing the HTML5 file from the third-party servers 612 associated with the web-based resource. Applications hosted by third-party servers 612 are programmed in JavaScript leveraging a Software Development Kit (SDK) provided by the Interaction servers 620. The SDK includes Application Programming Interfaces (APIs) with functions that can be called or invoked by the web-based application. The Interaction servers 620 host a JavaScript library that provides a given external resource access to specific user data of the interaction client 604. HTML5 is an example of technology for programming games, but applications and resources programmed based on other technologies can be used.

To integrate the functions of the SDK into the web-based resource, the SDK is downloaded by the third-party server 612 from the Interaction servers 620 or is otherwise received by the third-party server 612. Once downloaded or received, the SDK is included as part of the application code of a web-based external resource. The code of the web-based resource can then call or invoke functions of the SDK to integrate features of the interaction client 604 into the web-based resource.

The SDK stored on the interaction server system 610 effectively provides the bridge between an external resource (e.g., applications 606 or applets) and the interaction client 604. This gives the user a seamless experience of communicating with other users on the interaction client 604 while also preserving the look and feel of the interaction client 604. To bridge communications between an external resource and an interaction client 604, the SDK facilitates communication between third-party servers 612 and the interaction client 604. A WebViewJavaScriptBridge running on a computing system 602 establishes two one-way communication channels between an external resource and the interaction client 604. Messages are sent between the external resource and the interaction client 604 via these communication channels asynchronously. Each SDK function invocation is sent as a message and callback. Each SDK function is implemented by constructing a unique callback identifier and sending a message with that callback identifier.

By using the SDK, not all information from the interaction client 604 is shared with third-party servers 612. The SDK limits which information is shared based on the needs of the external resource. Each third-party server 612 provides an HTML5 file corresponding to the web-based external resource to Interaction servers 620. The Interaction servers 620 can add a visual representation (such as a box art or other graphic) of the web-based external resource in the interaction client 604. Once the user selects the visual representation or instructs the interaction client 604 through a GUI of the interaction client 604 to access features of the web-based external resource, the interaction client 604 obtains the HTML5 file and instantiates the resources to access the features of the web-based external resource.

The interaction client 604 presents a graphical user interface (e.g., a landing page or title screen) for an external resource. During, before, or after presenting the landing page or title screen, the interaction client 604 determines whether the launched external resource has been previously authorized to access user data of the interaction client 604. In response to determining that the launched external resource has been previously authorized to access user data of the interaction client 604, the interaction client 604 presents another graphical user interface of the external resource that includes functions and features of the external resource. In response to determining that the launched external resource has not been previously authorized to access user data of the interaction client 604, after a threshold period of time (e.g., 3 seconds) of displaying the landing page or title screen of the external resource, the interaction client 604 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 604 adds the external resource to a list of authorized external resources and allows the external resource to access user data from the interaction client 604. The external resource is authorized by the interaction client 604 to access the user data under an OAuth 2 framework.

The interaction client 604 controls the type of user data that is shared with external resources based on the type of external resource being authorized. For example, external resources that include full-scale applications (e.g., an application 606) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 832 operationally enables the purchasing of advertisements by third parties for presentation to end-users via the interaction clients 604 and also handles the delivery and presentation of these advertisements.

Figure 9:
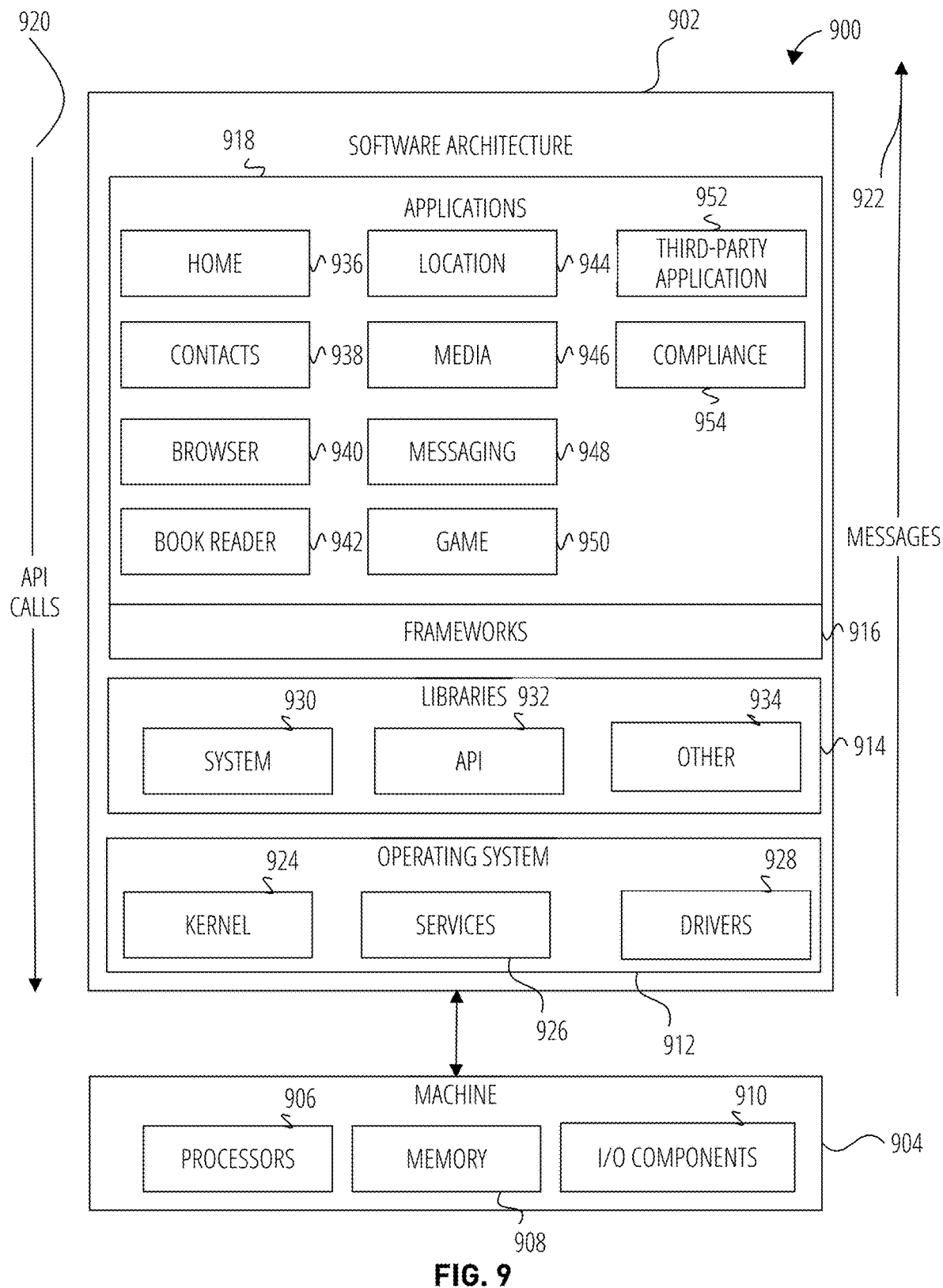
FIG. 9 is a block diagram showing a software architecture, according to some examples.

FIG. 9 is a block diagram 900 illustrating a software architecture 902, which can be installed on any one or more of the devices described herein. The software architecture 902 is supported by hardware such as a machine 904 that includes hardware processors 906, memory 908, and I/O components 910. In this example, the software architecture 902 can be conceptualized as a stack of layers, where each layer provides a particular functionality. The software architecture 902 includes layers such as an operating system 912, libraries 914, frameworks 916, and applications 918. Operationally, the applications 918 invoke API calls 920 through the software stack and receive messages 922 in response to the API calls 920.

The operating system 912 manages hardware resources and provides common services. The operating system 912 includes, for example, a kernel 924, services 926, and drivers 928. The kernel 924 acts as an abstraction layer between the hardware and the other software layers. For example, the kernel 924 provides memory management, processor management (e.g., scheduling), component management, networking, and security settings, among other functionalities. The services 926 can provide other common services for the other software layers. The drivers 928 are responsible for controlling or interfacing with the underlying hardware. For instance, the drivers 928 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 914 provide a common low-level infrastructure used by the applications 918. The libraries 914 can include system libraries 930 (e.g., C standard library) that provide functions such as memory allocation functions, string manipulation functions, mathematic functions, and the like. In addition, the libraries 914 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 914 can also include a wide variety of other libraries 934 to provide many other APIs to the applications 918.

The frameworks 916 provide a common high-level infrastructure that is used by the applications 918. For example, the frameworks 916 provide various graphical user interface (GUI) functions, high-level resource management, and high-level location services. The frameworks 916 can provide a broad spectrum of other APIs that can be used by the applications 918, some of which can be specific to a particular operating system or platform.

In an example, the applications 918 can include a home application 936, a contacts application 938, a browser application 940, a book reader application 942, a location application 944, a media application 946, a messaging application 948, a game application 950, and a broad assortment of other applications such as a third-party application 952. The applications 918 are programs that execute functions defined in the programs. Various programming languages can be employed to create one or more of the applications 918, structured in a variety of manners, such as object-oriented programming languages (e.g., Objective-C, Java, or C++) or procedural programming languages (e.g., C or assembly language). In a specific example, the third-party application 952 (e.g., an application developed using the ANDROID™ or IOS™ software development kit (SDK) by an entity other than the vendor of the particular platform) can be mobile software running on a mobile operating system such as IOS™, ANDROID™, WINDOWS® Phone, or another mobile operating system. In this example, the third-party application 952 can invoke the API calls 920 provided by the operating system 912 to facilitate functionalities described herein.

The applications 918 further include a compliance application 954. The compliance application 954 facilitates compliance by the XR system 408 (of FIG. 4A) with data privacy and other regulations, including for example the California Consumer Privacy Act (CCPA), General Data Protection Regulation (GDPR), and Digital Services Act (DSA). The compliance application 954 comprises several components that address data privacy, protection, and user rights, ensuring a secure environment for user data. A data collection and storage component securely handles user data, using encryption and enforcing data retention policies. A data access and processing component provides controlled access to user data, ensuring compliant data processing and maintaining an audit trail. A data subject rights management component facilitates user rights requests in accordance with privacy regulations, while the data breach detection and response component detects and responds to data breaches in a timely and compliant manner. The compliance application 654 also incorporates opt-in/opt-out management and privacy controls across any digital interaction systems that the XR device 410 may be coupled to, empowering users to manage their data preferences. The compliance application 954 is designed to handle sensitive data by obtaining explicit consent, implementing strict access controls and in accordance with applicable laws.

Described implementations of the subject matter can include one or more features, alone or in combination as illustrated below by way of example.

Example 1 is a machine-implemented method comprising: continuously monitoring neurological signals of a user by at least one processor of an extended Reality (XR) system operating in a low-power mode; generating an engagement signal using the neurological signals; responsive to generating the engagement signal, performing operations comprising: capturing real-world environment data by activating at least one environmental sensor to capture the real-world environment data of a real-world environment; generating contextual data using the real-world environment data; determining XR content to be displayed to the user using the contextual data; and selectively activating one or more XR capabilities of the XR system to display XR content.

In Example 2, the subject matter of Example 1 includes, wherein generating the engagement signal comprises: tracking eye movements of the user; detecting an intentional eye movement pattern using the eye movements; and generating the engagement signal using the intentional eye movement pattern and the neurological signals.

In Example 3, the subject matter of any of Examples 1-2 includes, wherein generating the engagement signal comprises: using a first Machine Learning (ML) model to generate a continuous engagement value; using a second ML model to detect a user intent as a brain-based click; and generating the engagement signal using the continuous engagement value and the brain-based click.

In Example 4, the subject matter of any of Examples 1-3 includes, wherein determining the XR content comprises: determining an identification of a physical object in the real-world environment using the real-world environment data; and generating the contextual data using the identification of the physical object.

In Example 5, the subject matter of any of Examples 1-4 includes, providing feedback to the user prior to activating the XR capabilities; and analyzing a neurological response to the feedback to confirm user intent using the neurological signals.

In Example 6, the subject matter of any of Examples 1-5 includes, detecting a presence of an additional user using an additional XR system; and analyzing respective engagement signals and real-world environment data of the XR system and the additional XR system to generate a shared engagement signal.

In Example 7, the subject matter of any of Examples 1-6 includes, maintaining the processor in the low-power mode while monitoring the neurological signals; and activating additional processing capabilities of the processor after detecting the engagement signal.

In Example 8, the subject matter of any of Examples 1-7 includes, training a machine learning model using heterogeneous brain signal data from multiple users; adapting the machine learning model to account for inter-individual variability in brain patterns; and personalizing the model through user-specific fine-tuning.

In Example 9, the subject matter of any of Examples 1-8 includes, collecting training data during user task performance; verifying user engagement during data collection; processing heterogeneous data types from multiple collection scenarios; and adapting model training based on verified engagement patterns.

In Example 10, the subject matter of any of Examples 1-9 includes, implementing a neurofeedback loop by: displaying brain activity visualization to the user; detecting changes in brain activity in response to the visualization; and adapting system behavior based on the detected changes.

In Example 11, the subject matter of any of Examples 1-10 includes, collecting engagement-specific training data; breaking down engagement into measurable quantities; tuning the system for different user accents and responses; and validating collected training data against measured engagement metrics.

In Example 12, the subject matter of any of Examples 1-11 includes, wherein activating environmental sensors comprises: selectively activating specific sensors based on detected context; integrating social feature data from connected users; and processing prior knowledge about user preferences to determine sensor activation.

In Example 13, the subject matter of any of Examples 1-12 includes, wherein operating the processor comprises: transitioning between multiple power states; implementing selective sensor activation based on power state; and managing power consumption through staged activation of processing capabilities.

In Example 14, the subject matter of any of Examples 1-13 includes, detecting presence of multiple users in a space; analyzing synchronization of brain activity patterns between the multiple users; determining shared engagement based on the synchronized brain patterns; and adapting content display based on the detected shared engagement.

In Example 15, the subject matter of any of Examples 1-14 includes, wherein selectively activating XR capabilities comprises: implementing low-power display notifications prior to full AR activation; displaying fixed notifications without activating full XR capabilities; and stabilizing displayed images relative to real-world context.

In Example 16, the subject matter of any of Examples 1-15 includes, analyzing brain responses to notification sounds; detecting confirmation signals in brain activity patterns; implementing neural feedback loops based on detected responses; and adapting system behavior based on the neural feedback.

In Example 17, the subject matter of any of Examples 1-16 includes, wherein collecting contextual data comprises: analyzing user movement patterns to distinguish between stationary and moving states; detecting user movement patterns relative to observed objects; integrating social connection data; and processing friend presence data to provide social context.

In Example 18, the subject matter of any of Examples 1-17 includes, Hz frequency band; implementing real-time decoding of subtle focus changes; detecting endogenous brain rhythms; and analyzing brain wave patterns to determine user cognitive state.

In Example 19, the subject matter of any of Examples 1-18 includes, wherein implementing passive BCI comprises: monitoring user mental states without active control; adapting system behavior based on detected mental states; implementing background monitoring processes; and conforming system responses to passive mental state changes.

In Example 20, the subject matter of any of Examples 1-19 includes, wherein implementing motor imagery detection comprises: detecting motor imagery-based brain switch signals; handling response times greater than five seconds; validating motor-based command intentions; and processing motor imagery patterns for system control.

In Example 21, the subject matter of any of Examples 1-20 includes, wherein handling user variability comprises: detecting individual differences in brain wave patterns; adapting to variations in alpha wave production; implementing personalized model fine-tuning; and validating model performance across different users.

In Example 22, the subject matter of any of Examples 1-21 includes, wherein optimizing sensor placement comprises: targeting occipital and parietal brain regions; maintaining form-factor compatibility; validating signal quality at different positions; and implementing position-specific signal processing.

In Example 23, the subject matter of any of Examples 1-22 includes, wherein processing training data comprises: handling data without temporal supervision markers; validating user task performance accuracy; processing heterogeneous training datasets; and implementing adaptive training validation.

In Example 24, the subject matter of any of Examples 1-23 includes, wherein implementing camera integration comprises: detecting content using camera input; monitoring visual environment changes; implementing content-based engagement detection; and processing visual data for context determination.

In Example 25, the subject matter of any of Examples 1-24 includes, wherein implementing hand tracking comprises: combining hand tracking with BCI signals; processing hand-based selection inputs; implementing two-handed interaction protocols; and coordinating hand and brain signal processing.

In Example 26, the subject matter of any of Examples 1-25 includes, wherein implementing raycast integration comprises: combining raycast targeting with brain signals; confirming selections using BCI input; implementing hybrid interaction modes; and coordinating multiple input streams.

In Example 27, the subject matter of any of Examples 1-26 includes, wherein detecting visual focus comprises: monitoring endogenous markers of visual focus; processing EEG signals for focus detection; implementing focus-based display activation; and validating focus detection accuracy.

In Example 28, the subject matter of any of Examples 1-27 includes, wherein analyzing brain patterns comprises: distinguishing intentional from exploratory eye movements; detecting brain response variations; implementing intent-based pattern recognition; and validating pattern detection accuracy.

In Example 29, the subject matter of any of Examples 1-28 includes, wherein implementing neuromorphic processor integration comprises: running machine learning neural networks in an efficient manner; operating in variable power consumption modes; implementing neuromorphic processing capabilities; and maintaining low power operation states.

In Example 30, the subject matter of any of Examples 1-29 includes, wherein implementing frequency operations comprises: operating processing pipelines at reduced frequencies; implementing reduced memory requirement modes; switching between power consumption states; and optimizing processing frequency based on operational needs.

In Example 31, the subject matter of any of Examples 1-30 includes, wherein implementing temple contact management comprises: detecting contact quality across multiple sensors; compensating for unequal sensor contact; conforming to glasses form factor requirements; and implementing variable contact signal processing.

In Example 32, the subject matter of any of Examples 1-31 includes, wherein integrating prior knowledge comprises: processing user preference information; integrating social network connection data; implementing friend proximity detection; and analyzing social context for content selection.

In Example 33, the subject matter of any of Examples 1-32 includes, wherein implementing neurofeedback comprises: monitoring brain activity response patterns; implementing neural feedback loops; analyzing brain activity changes; and adapting system behavior based on neural feedback.

In Example 34, the subject matter of any of Examples 1-33 includes, wherein the XR system is a head-wearable apparatus.

Example 35 is at least one machine-readable medium including instructions that, when executed by processing circuitry, cause the processing circuitry to perform operations to implement any of Examples 1-34.

Example 36 is an apparatus comprising means to implement any of Examples 1-34.

Example 37 is a system to implement any of Examples 1-34.

CONCLUSION

Changes and modifications can be made to the disclosed examples without departing from the scope of the present disclosure. These and other changes or modifications are intended to be included within the scope of the present disclosure, as expressed in the following claims.

Glossary

"Carrier signal" refers to any intangible medium that is capable of storing, encoding, or carrying instructions for execution by the machine and includes digital or analog communications signals or other intangible media to facilitate communication of such instructions. Instructions can be transmitted or received over a network using a transmission medium via a network interface device.

"Client device" refers to any machine that interfaces to a communications network to obtain resources from one or more server systems or other client devices. A client device can be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user can use to access a network.

"Communication network" refers to one or more portions of a network that can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network can include a wireless or cellular network, and the coupling can be a Code Division Multiple Access (CDMA) connection, a Global System for Mobile communications (GSM) connection, or other types of cellular or wireless coupling. In this example, the coupling can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components can be combined via their interfaces with other components to carry out a machine process. A component can be a packaged functional hardware unit designed for use with other components and a part of a program that usually performs a particular function of related functions. Components can constitute either software components (e.g., code embodied on a machine-readable medium) or hardware components. A "hardware component" is a tangible unit capable of performing operations and can be configured or arranged in a physical manner. In various examples, one or more computer systems (e.g., a standalone computer system, a client computer system, or a server computer system) or one or more hardware components of a computer system (e.g., a processor or a group of processors) can be configured by software (e.g., an application or application portion) as a hardware component that operates to perform operations as described herein. A hardware component can also be implemented mechanically, electronically, or any suitable combination thereof. For example, a hardware component can include dedicated circuitry or logic that is permanently configured to perform specified operations. A hardware component can be a special-purpose processor, such as a field-programmable gate array (FPGA) or an application-specific integrated circuit (ASIC). A hardware component can also include programmable logic or circuitry that is temporarily configured by software to perform specified operations. For example, a hardware component can include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), can be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a specified manner or to perform specified operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor can be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In examples in which multiple hardware components are configured or instantiated at different times, communications between such hardware components can be achieved, for example, through the storage and retrieval of information in memory structures to which the multiple hardware components have access. For example, one hardware component can perform an operation and store the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information). The various operations of example methods described herein can be performed, at least partially, by one or more processors that are temporarily configured (e.g., by software) or permanently configured to perform the relevant operations. Whether temporarily or permanently configured, such processors can constitute processor-implemented components that operate to perform one or more operations or functions described herein. As used herein, "processor-implemented component" refers to a hardware component implemented using one or more processors. Similarly, the methods described herein can be at least partially processor-implemented, with a particular processor or processors being an example of hardware. For example, at least some of the operations of a method can be performed by one or more processors or processor-implemented components. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API). The performance of some of the operations can be distributed among the processors, not only residing within a single machine, but deployed across a number of machines. In some examples, the processors or processor-implemented components can be located in a single geographic location (e.g., within a home environment, an office environment, or a server farm). In other examples, the processors or processor-implemented components can be distributed across a number of geographic locations.

"Machine-readable storage medium" refers to both machine-storage media and transmission media. Thus, the terms include both storage devices/media and carrier waves/modulated data signals. The terms "computer-readable medium," "machine-readable medium" and "device-readable medium" mean the same thing and can be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and can be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory machine-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and can be used interchangeably in this disclosure.

Changes and modifications can be made to the disclosed examples without departing from the scope of the present disclosure. These and other changes or modifications are intended to be included within the scope of the present disclosure, as expressed in the following claims.

What is claimed is:

1. A machine-implemented method comprising:
   continuously monitoring neurological signals of a user by at least one processor of an extended Reality (XR) system operating in a low-power mode;
   generating an engagement signal using the neurological signals;
   responsive to generating the engagement signal, performing operations comprising:
   capturing real-world environment data by activating at least one environmental sensor to capture the real-world environment data of a real-world environment;
   generating contextual data using the real-world environment data;
   determining XR content to be displayed to the user using the contextual data; and
   selectively activating one or more XR capabilities of the XR system to display XR content.

2. The method of claim 1, wherein generating the engagement signal comprises:
   tracking eye movements of the user;
   detecting an intentional eye movement pattern using the eye movements; and
   generating the engagement signal using the intentional eye movement pattern and the neurological signals.

3. The method of claim 1, wherein generating the engagement signal comprises:
   using a first Machine Learning (ML) model to generate a continuous engagement value;
   using a second ML model to detect a user intent as a brain-based click; and
   generating the engagement signal using the continuous engagement value and the brain-based click.

4. The method of claim 1, wherein determining the XR content comprises:
   determining an identification of a physical object in the real-world environment using the real-world environment data; and
   generating the contextual data using the identification of the physical object.

5. The machine-implemented method of claim 1, further comprising:
   providing feedback to the user prior to activating the XR capabilities; and
   analyzing a neurological response to the feedback to confirm user intent using the neurological signals.

6. The machine-implemented method of claim 1, further comprising:
   detecting a presence of an additional user using an additional XR system; and
   analyzing respective engagement signals and real-world environment data of the XR system and the additional XR system to generate a shared engagement signal.

7. The machine-implemented method of claim 1, wherein the XR system is a head-wearable apparatus.

8. A machine comprising:
   at least one processor; and
   at least one memory storing instructions that, when executed by the at least one processor, cause the machine to perform operations comprising:
   continuously monitoring neurological signals of a user by the at least one processor operating in a low-power mode;
   generating an engagement signal using the neurological signals;
   responsive to generating the engagement signal, performing operations comprising:
   capturing real-world environment data by activating at least one environmental sensor to capture the real-world environment data of a real-world environment;
   generating contextual data using the real-world environment data;
   determining extended Reality (XR) content to be displayed to the user using the contextual data; and
   selectively activating one or more XR capabilities of an XR system to display XR content.

9. The machine of claim 8, wherein generating the engagement signal comprises:
 tracking eye movements of the user;
 detecting an intentional eye movement pattern using the eye movements; and
 generating the engagement signal using the intentional eye movement pattern and the neurological signals.

10. The machine of claim 8, wherein generating the engagement signal comprises:
 using a first Machine Learning (ML) model to generate a continuous engagement value;
 using a second ML model to detect a user intent as a brain-based click; and
 generating the engagement signal using the continuous engagement value and the brain-based click.

11. The machine of claim 8, wherein determining the XR content comprises:
 determining an identification of a physical object in the real-world environment using the real-world environment data; and
 generating the contextual data using the identification of the physical object.

12. The machine of claim 8, wherein the operations further comprise:
 providing feedback to the user prior to activating the XR capabilities; and
 analyzing a neurological response to the feedback to confirm user intent using the neurological signals.

13. The machine of claim 8, wherein the operations further comprise:
 detecting a presence of an additional user using an additional XR system; and
 analyzing respective engagement signals and real-world environment data of the XR system and the additional XR system to generate a shared engagement signal.

14. The machine of claim 8, wherein the XR system is a head-wearable apparatus.

15. A machine-storage medium, the machine-storage medium including instructions that, when executed by a machine, cause the machine to perform operations comprising:
 continuously monitoring neurological signals of a user by at least one processor of an extended Reality (XR) system operating in a low-power mode;
 generating an engagement signal using the neurological signals;
 responsive to generating the engagement signal, performing operations comprising:
 capturing real-world environment data by activating at least one environmental sensor to capture the real-world environment data of a real-world environment;
 generating contextual data using the real-world environment data;
 determining XR content to be displayed to the user using the contextual data; and
 selectively activating one or more XR capabilities of the XR system to display XR content.

16. The machine-storage medium of claim 15, wherein generating the engagement signal comprises:
 tracking eye movements of the user;
 detecting an intentional eye movement pattern using the eye movements; and
 generating the engagement signal using the intentional eye movement pattern and the neurological signals.

17. The machine-storage medium of claim 15, wherein generating the engagement signal comprises:
 using a first Machine Learning (ML) model to generate a continuous engagement value;
 using a second ML model to detect a user intent as a brain-based click; and
 generating the engagement signal using the continuous engagement value and the brain-based click.

18. The machine-storage medium of claim 15, wherein determining the XR content comprises:
 determining an identification of a physical object in the real-world environment using the real-world environment data; and
 generating the contextual data using the identification of the physical object.

19. The machine-storage medium of claim 15, wherein the operations further comprise:
 providing feedback to the user prior to activating the XR capabilities; and
 analyzing a neurological response to the feedback to confirm user intent using the neurological signals.

20. The machine-storage medium of claim 15, wherein the XR system is a head-wearable apparatus.

* * * * *